(12) United States Patent
Marc

(10) Patent No.: US 9,334,793 B1
(45) Date of Patent: May 10, 2016

(54) ROTARY ENGINE HAVING TWO ROTORS WITH INTERSECTING PATHWAYS

(71) Applicant: NOVATION IQ LLC, Lenexa, KS (US)

(72) Inventor: Michel Marc, Lenexa, KS (US)

(73) Assignee: NOVATION IQ LLC, Lenexa, KS (US)

( * ) Notice: Subject to any disclaimer, the term of this patent is extended or adjusted under 35 U.S.C. 154(b) by 0 days.

(21) Appl. No.: 14/534,426

(22) Filed: Nov. 6, 2014

(51) Int. Cl.
  *F02B 53/00* (2006.01)
  *F02B 55/02* (2006.01)
  *F01C 1/12* (2006.01)
  *F02B 53/02* (2006.01)

(52) U.S. Cl.
  CPC . *F02B 55/02* (2013.01); *F01C 1/12* (2013.01); *F02B 53/02* (2013.01)

(58) Field of Classification Search
  CPC ................................ Y02T 10/17; F02B 53/00
  USPC ............................................. 123/238; 418/36
  See application file for complete search history.

(56) References Cited

U.S. PATENT DOCUMENTS

| | | | |
|---|---|---|---|
| 53,915 A | 4/1866 | Behrens | |
| 77,373 A | 4/1868 | Hardy | |
| 420,331 A | 1/1890 | Brown | |
| 478,843 A | 7/1892 | Brown | |
| 507,780 A | 10/1893 | Brown | |
| 597,709 A * | 1/1898 | Chaudun ........................ | 123/238 |
| 606,606 A | 6/1898 | Unbehend | |
| 626,206 A | 5/1899 | Jasper | |
| 674,258 A | 5/1901 | Croston | |
| 724,665 A | 4/1903 | Cooley | |
| 724,994 A | 4/1903 | Cooley | |
| 725,615 A | 4/1903 | Cooley | |
| 735,203 A | 8/1903 | Bridge | |
| 748,348 A | 12/1903 | Cooley | |
| 823,717 A | 6/1906 | Ellis | |
| 1,229,949 A * | 6/1917 | Harrigan ................. | F02B 53/00 |
| | | | 123/232 |
| 1,242,826 A * | 10/1917 | Llewellyn ..................... | 123/238 |

(Continued)

FOREIGN PATENT DOCUMENTS

DE          3825372 A1 *   2/1990   .............. F02B 53/00

OTHER PUBLICATIONS

"Rotary Internal-Combustion Engines", updated Oct. 19, 2009. This document was downloaded from the internet at http://www.aqp143.dsl.pipex.com/MUSEUM/POWER/unusualICeng/rotaryIC/rotaryIC.htm on Jul. 8, 2014. (8 pgs.).

(Continued)

*Primary Examiner* — Mary A Davis
(74) *Attorney, Agent, or Firm* — Stinson Leonard Street LLP

(57) ABSTRACT

An engine including a block that has first and second intersecting pathways, and first and second rotors positioned within the first and second pathways, respectively. The first and second rotors are moveable within the first and second pathways, respectively, between first and second combustion positions. A first combustion chamber is formed within the first pathway between the first and second rotors when they are in the first combustion position, and a second combustion chamber is formed within the second pathway between the first and second rotors when they are in the second combustion position. The pathways and rotors are preferably torus shaped, and the rotors preferably have concave leading and trailing ends. The engine block preferably has a single intake for both of the first and second combustion chambers. Recesses are preferably formed in the block to receive seals that engage the rotors.

28 Claims, 13 Drawing Sheets

FIG. 4

(56) References Cited

U.S. PATENT DOCUMENTS

| | | | |
|---|---|---|---|
| 1,850,904 A * | 3/1932 | Woodward | 123/239 |
| 3,743,451 A | 7/1973 | Chapman | |
| 3,797,237 A | 3/1974 | Kamiya | |
| 3,863,609 A * | 2/1975 | Ikarashi | 123/239 |
| 4,037,997 A | 7/1977 | Sarich | |
| 7,621,254 B2 * | 11/2009 | Rahon | 123/221 |
| 8,578,696 B2 * | 11/2013 | Sundaram | F01D 25/30 |
| | | | 60/39.5 |

OTHER PUBLICATIONS

"Rotary Steam Engines: p. 6", updated Apr. 23, 2009. This document was downloaded from the internet at http://www.aqp143.dsl.pipex.com/MUSEUM/POWER/rotaryengines/rotaryeng6.htm on Jul. 8, 2014. (33 pgs.).

* cited by examiner

ROTARY ENGINE HAVING TWO ROTORS WITH INTERSECTING PATHWAYS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to engines and, more particularly, to an enhanced efficiency engine.

2. Description of Related Art

The majority of conventional internal combustion engines include pistons each of which linearly reciprocates within a cylinder formed in an engine block. These conventional engines are relatively inefficient because the piston must move in a direction that opposes the expansion of a combusted air/fuel mixture within the cylinder in order to exhaust that combusted air/fuel mixture from the cylinder and, as a result, energy from the combustion of the air/fuel mixture is lost. In addition, because the piston is moving in a direction that opposes the expansion of the combusted air/fuel mixture, mechanical energy from the engine must be used to force the combusted air/fuel mixture out of the cylinder. Conventional engines also require at least one exhaust valve to allow the combusted air/fuel mixture to exhaust from the cylinder.

There are also internal combustion engines having rotating pistons. U.S. Pat. No. 626,206 to Jasper describes one example of an engine having rotating pistons. The pistons have a rectangular cross-section and rotate in opposite directions in the engine. The engine has a relatively complex structure because two inlets are formed in the engine for each of the pistons. One inlet allows fuel and air to enter the engine, and another inlet, formed in the opposite side of the engine, allows a flame to ignite the fuel and air mixture. Thus, four inlets are formed in the engine for two pistons. The engine also does not include seals to effectively prevent the inadvertent exhaust of combusted air and fuel.

U.S. Pat. No. 3,797,237 to Kamiya describes another type of engine having rotating pistons. The engine in Kamiya also has a relatively complex structure in that an inlet is formed in the engine for each piston. Each inlet feeds combusted fuel and air into the engine to rotate a piston. Each inlet is joined to a tube that receives air from an opening in the engine that is associated with the other piston. Further, the ends of each piston have an S-shape, which prevents the engine from effectively sealing against the inadvertent exhaust of combusted air and fuel.

The conventional engines described above also typically include a coolant system that dissipates heat generated by the combustion of the air/fuel mixture within the cylinder. The failure to convert this heat energy into useable mechanical or electric energy is another inefficiency of conventional engines.

BRIEF SUMMARY OF THE INVENTION

An engine in accordance with an exemplary embodiment of the present invention includes a block with first and second intersecting pathways, and first and second rotors positioned within the first and second pathways, respectively. The first and second rotors are moveable within the first and second pathways between first and second combustion positions. A first combustion chamber is formed within the first pathway between the first and second rotors when the first and second rotors are in the first combustion position, and a second combustion chamber is formed within the second pathway between the first and second rotors when the first and second rotors are in the second combustion position. The second rotor acts as a valve for the first rotor when the rotors are in the first combustion position to prevent combustion gases from inadvertently exhausting from the first combustion chamber, and the first rotor acts as a valve for the second rotor when the rotors are in the second combustion position to prevent combustion gases from inadvertently exhausting from the second combustion chamber.

Preferably, the first and second pathways are each shaped like a torus, and the first and second rotors each have a central disc and a partial torus extending outward from the central disc. The partial torus of each rotor preferably has a leading end with a concave surface and a trailing end with a concave surface to prevent interference between the rotors as they move within the first and second pathways. The first and second rotors rotate within the first and second pathways, respectively, between the first and second combustion positions. The first and second rotors are joined to first and second shafts, respectively, to which are mounted first and second mating gears, respectively. In the exemplary embodiment, the first shaft is coupled to an electric generator and the second shaft is coupled to an air compressor. A plurality of thermoelectric device arrays and heat sinks are preferably coupled to the block for converting heat energy into electric energy.

The engine block preferably includes a single intake for both the first rotor and the second rotor. The intake is in fluid communication with the first combustion chamber when the first and second rotors are in the first combustion position, and the intake is in fluid communication with the second combustion chamber when the first and second rotors are in the second combustion position. First and second recesses are preferably formed in the block adjacent to the first and second pathways, respectively. A first seal is positioned within the first recess to seal between the first rotor and block when the rotors are in the first combustion position, and a second seal is positioned within the second recess to seal between the second rotor and block when the rotors are in the second combustion position.

The efficiency of the engine is enhanced due to one or more aspects of the present invention. In one aspect, the first and second rotors interact with each other to form first and second combustion chambers within the first and second intersecting pathways. The rotors rotate in a direction that does not oppose the expansion of a combusted air/fuel mixture within the combustion chambers to enhance the engine's efficiency. The rotors have a longer stroke than the stroke of a conventional reciprocating piston engine before the combustion gases are exhausted from the combustion chambers. In another aspect, thermoelectric device arrays and heat sinks are used to convert heat energy into electric energy for additional efficiency gains. In yet another aspect, the efficiency of the engine is also increased by converting the mechanical energy of the shafts into electric energy through the electric generator. One skilled in the art will appreciate that any combination of these aspects of the invention may be utilized to increase the efficiency of the engine.

BRIEF DESCRIPTION OF THE DRAWINGS

An exemplary embodiment of the present invention is described in detail below with reference to the attached drawing figures, wherein.

DETAILED DESCRIPTION OF EXEMPLARY EMBODIMENTS

The present invention is directed to an engine with first and second rotors that rotate in a direction that does not oppose the expansion of a combusted air/fuel mixture within the combustion chambers to thereby enhance the engine's efficiency. While the invention will be described in detail below with reference to exemplary embodiments of an engine intended to be mounted within a vehicle, it should be understood that the invention is not limited to the specific structural configurations of these embodiments or to the particular application within a vehicle. For example, the engine could have other structural configurations and could be used in other applications, such as engines for electric generators or lawn and garden equipment. In addition, although the exemplary embodiments are described as embodying several different inventive features, one skilled in the art will appreciate that any one of these features could be implemented without the others in accordance with the invention. For example, while certain exemplary embodiments describe an engine used in combination with various thermoelectric devices, the engine could be used without such devices or could be used with other types of devices that provide enhanced efficiencies.

I. Structural Configuration of Engine

Figure 1:
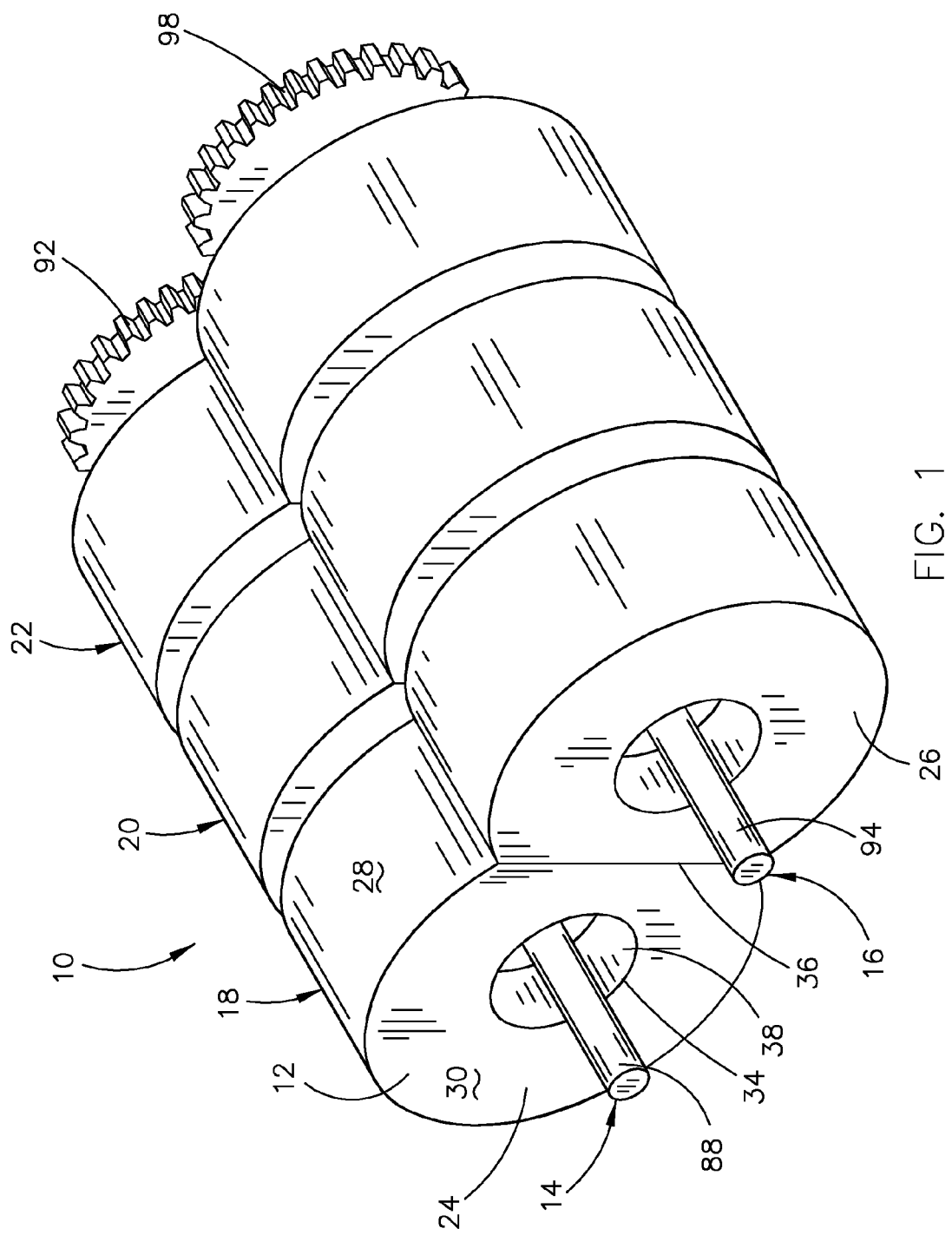
FIG. 1 is a perspective view of an exemplary embodiment of an engine in accordance with the present invention.

Referring to FIG. 1, an exemplary embodiment of an engine in accordance with the present invention is shown generally as reference numeral 10. Engine 10 includes a block 12, a first rotor and shaft assembly 14, and a second rotor and shaft assembly 16. Block 12 includes first, second, and third rotor housings 18, 20, and 22, respectively. Block 12 also preferably includes an outer housing (not shown) within which the first, second, and third rotor housings 18, 20, and 22 are mounted.

Figure 2:
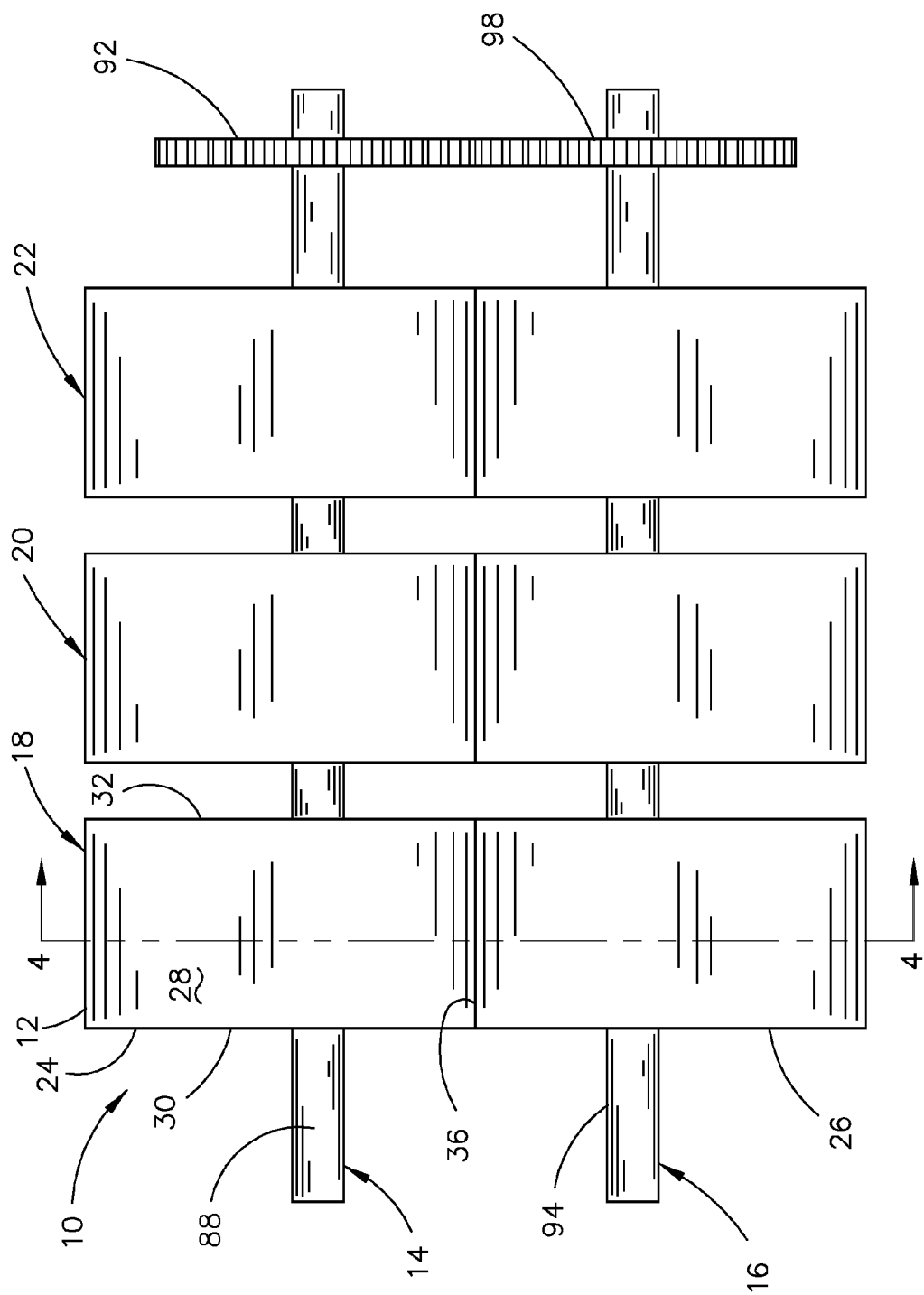
FIG. 2 is a top plan view of the engine of FIG. 1.

The first, second, and third rotor housings 18, 20, and 22 are substantially similar. Accordingly, only the first rotor housing 18 is described in detail herein. First rotor housing 18 includes a pair of truncated cylinders 24 and 26 that are joined together. Truncated cylinders 24 and 26 are mirror images of each other. Accordingly, only the structure of truncated cylinder 24 is described in detail herein. Truncated cylinder 24 has a partial cylindrical outer surface 28 and opposing end walls 30 and 32 (as shown in FIG. 2). Truncated cylinder 24 has a central opening 34 that passes therethrough from end wall 30 to end wall 32. Opening 34 is centered with respect to outer surface 28. Truncated cylinder 24 is truncated along a plane that is perpendicular to end walls 30 and 32 to form a mating surface 36 that abuts a like surface of truncated cylinder 26. Mating surface 36 is spaced a distance from the center of opening 34 which is slightly less than the distance from the center of opening 34 to outer surface 28. A cylindrical inner surface 38 surrounds and defines opening 34.

Figure 4:
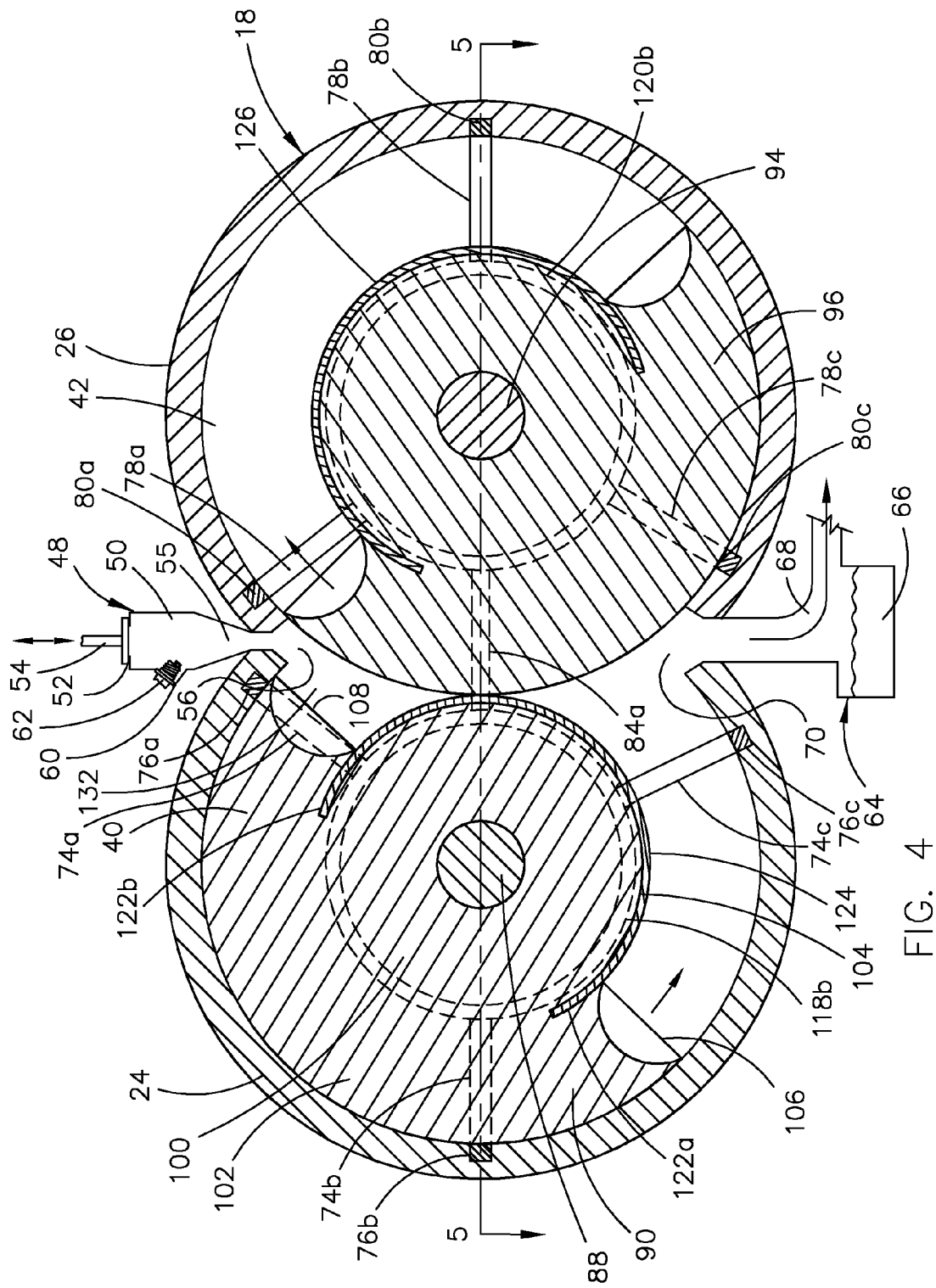
FIG. 4 is a cross-sectional view taken through the line 4-4 in FIG. 2 and showing the first and second rotors in a first combustion position.
Figure 5:
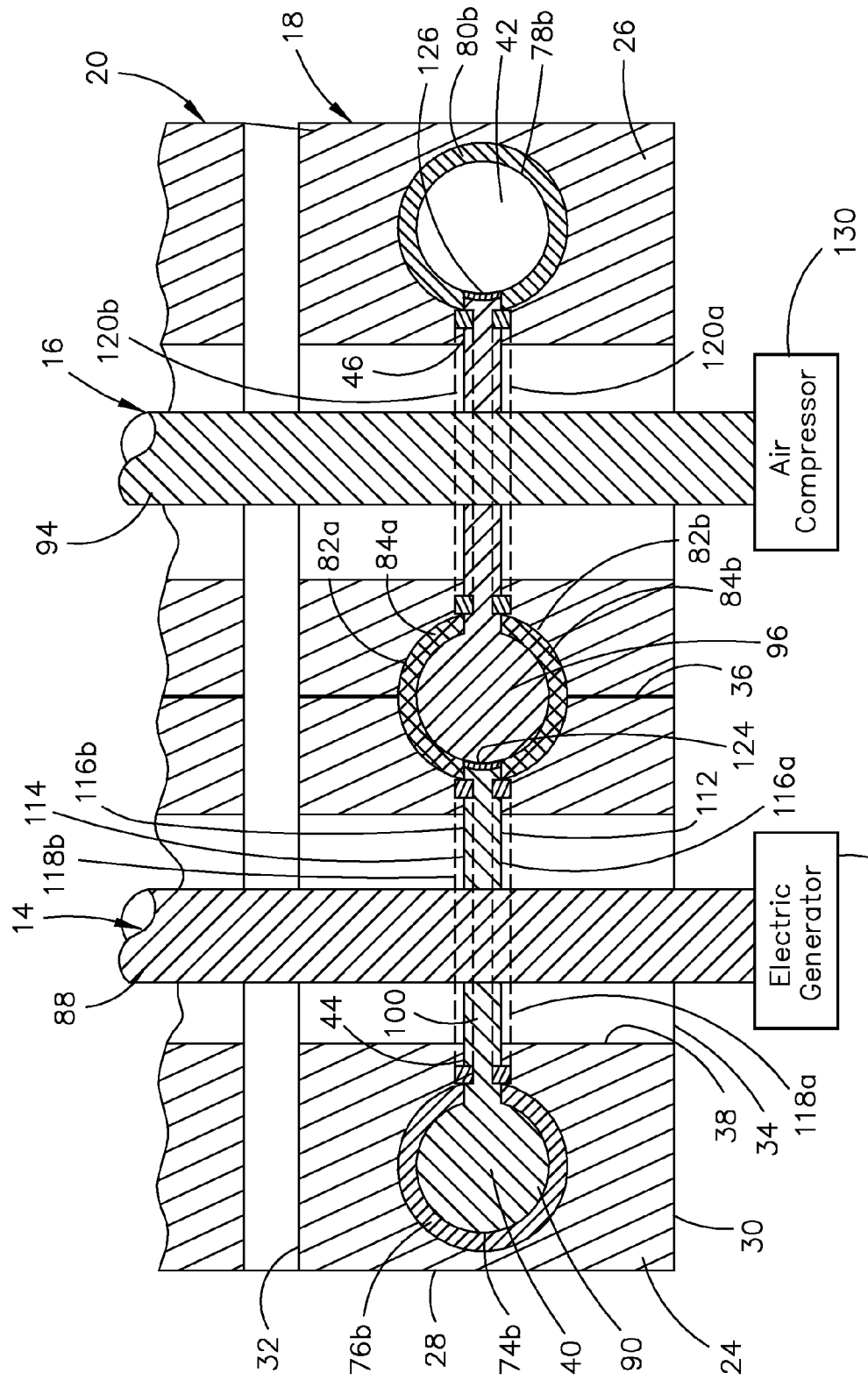
FIG. 5 is a cross-sectional view taken through the line 5-5 in FIG. 4.

Referring to FIGS. 4 and 5, first rotor housing 18 has first and second intersecting pathways 40 and 42 that are formed within truncated cylinders 24 and 26. Each of the first and second pathways 40 and 42 is shaped like a torus. The majority of first pathway 40 is formed within truncated cylinder 24, and the majority of second pathway 42 is formed within truncated cylinder 26. The first and second pathways 40 and 42 intersect along the plane where truncated cylinders 24 and 26 abut. In the location where the first and second pathways 40 and 42 intersect, a portion of first pathway 40 is positioned within truncated cylinder 26, and a portion of second pathway 42 is positioned within truncated cylinder 24. First pathway 40 is centered around opening 34 of truncated cylinder 24, and second pathway 42 is centered around the opening of truncated cylinder 26. Referring to FIG. 5, a ring-shaped slot 44 is formed within truncated cylinder 24. Slot 44 extends from first pathway 40 through inner surface 38 to opening 34, and is spaced equidistant from end walls 30 and 32. A similar ring-shaped slot 46 is formed within truncated cylinder 26.

Figure 3:
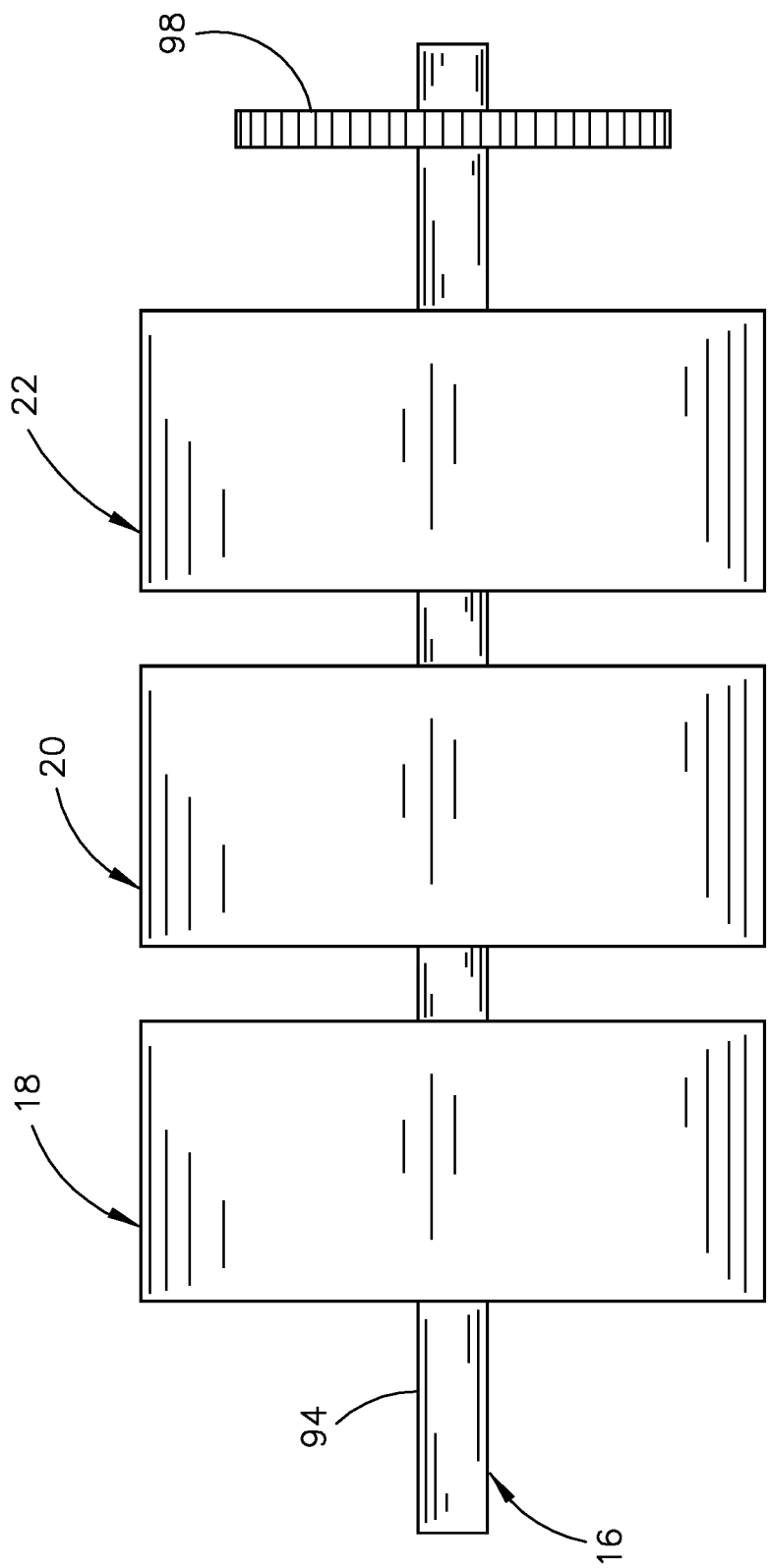
FIG. 3 is a front elevational view of the engine of FIG. 1.
Figure 6:
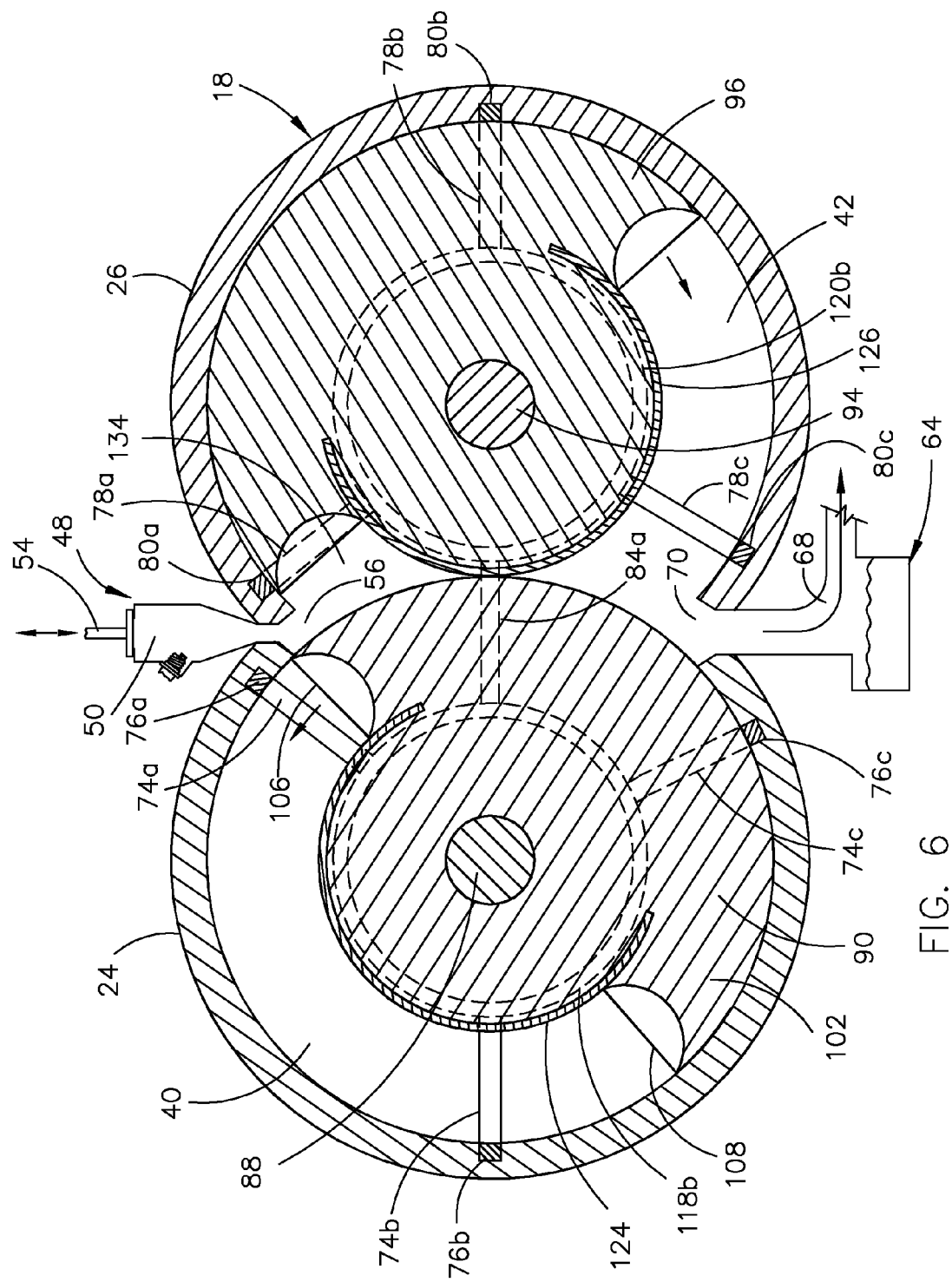
FIG. 6 is a cross-sectional view similar to FIG. 4 but showing the first and second rotors in a second combustion position.

Referring to FIG. 4, an intake assembly 48 is coupled to first rotor housing 18 and is designed to introduce air and fuel into the first and second pathways 40 and 42 (the intake assembly is not shown in FIGS. 1-3). Intake assembly 48 is positioned at the top of first rotor housing 18 where truncated cylinders 24 and 26 abut. Intake assembly 48 includes a plenum 50 with an upper opening 52 that is positioned adjacent a valve 54. Plenum 50 has a lower opening 55 that is in fluid communication with an intake 56 in first rotor housing 18. Intake 56 is adjacent intake assembly 48 and places first pathway 40 in fluid communication with plenum 50 when rotors 90 and 96 are in the first combustion position shown in FIG. 4. Intake 56 also places the second pathway 42 in fluid communication with plenum 50 when rotors 90 and 96 are in the second combustion position, as shown in FIG. 6. Thus, only a single valve 54 and a single intake 56 are necessary for both of first and second rotors 90 and 96. Valve 54 regulates air flow through upper opening 52 and intake 56 by moving vertically upward from the closed position shown in FIG. 4 to an open position and moving vertically downward from the open position to the closed position. Valve 54 is preferably coupled to shafts 88 and 94 via a cam assembly (not shown) that moves valve 54 between the open and closed positions at the desired time, as is known in the art.

Intake assembly 48 includes a spark plug opening 60 surrounded by threads that engage the threads of a spark plug 62. Anti-seize paste available under the trademark Permatex may be applied to the threads of the spark plug 62 to seal the opening 60. As described in more detail below, valve 54 is preferably timed to open at a desired time for introducing a pressurized fuel and air mixture into plenum 50, and close at a desired time for combustion of the fuel and air mixture. Spark plug 62 is also preferably timed to fire at a desired time. The second and third rotor housings 20 and 22 also include an intake assembly that is substantially similar to intake assembly 48 shown in FIG. 4. Only three valves are necessary for the six rotors of engine 10 because a single valve regulates the air and fuel mixture for two of the rotors. Of course, one skilled in the art will understand that the intake assemblies of the first, second and third rotor housings 18, 20, and 22 may alternatively form a single integrated intake assembly.

First rotor housing 18 also includes an exhaust assembly 64 as shown in FIG. 4 (the exhaust assembly is not shown in FIGS. 1-3). Exhaust assembly 64 includes a sump 66, which contains oil that is recirculated throughout the first and second pathways 40 and 42 via an oil pump (not shown). The oil used is preferably a high heat, non-flammable oil such as the oil sold by DuPont under the trademark Krytox. Exhaust assembly 64 also includes an exhaust air outlet 68 positioned above sump 66. An exhaust 70 in first rotor housing 18 places first pathway 40 in fluid communication with exhaust air outlet 68 when rotors 90 and 96 are in the position shown in FIG. 4. Exhaust 70 places second pathway 42 in fluid communication with exhaust air outlet 68 when rotors 90 and 96 are in the position shown in FIG. 6. Exhaust 70 is positioned opposite intake 56. The second and third rotor housings 20 and 22 also include an exhaust assembly that is substantially similar to exhaust assembly 64 shown in FIG. 4. Of course, one skilled in the art will understand that the exhaust assemblies of the first, second, and third rotor housings 18, 20, and 22 may alternatively form a single integrated exhaust assembly.

Referring to FIG. 4, annular recesses 74a, 74b and 74c are formed within truncated cylinder 24 surrounding first pathway 40. Each of the recesses 74a, 74b and 74c receives a seal 76a, 76b and 76c, respectively, which is positioned between the truncated cylinder 24 and first pathway 40. Seal 76a is positioned near intake 56, seal 76b is positioned approximately halfway between intake 56 and exhaust 70, and seal 76c is positioned near exhaust 70. The seals 76a, 76b and 76c are preferably rings made from metal, such as chrome, treated steel, or cast iron, and have a rectangular cross-section. Truncated cylinder 26 includes annular recesses 78a, 78b and 78c that are substantially similar to annular recesses 74a, 74b and 74c and seals 80a, 80b and 80c that are substantially similar to seals 76a, 76b and 76c. Annular recesses 78a, 78b and 78c receive seals 80a, 80b and 80c, respectively.

As shown in FIG. 5, a pair of opposed semi-circular recesses 82a and 82b are formed within truncated cylinders 24 and 26 surrounding first and second pathways 40 and 42 in the location where the pathways 40 and 42 intersect and are coterminous. Half of each of recesses 82a and 82b is formed within truncated cylinder 24 and the other half is formed within truncated cylinder 26. Recesses 82a and 82b receive seals 84a and 84b, respectively, which are positioned between the truncated cylinders 24 and 26 and first and second pathways 40 and 42. Each of seals 84a and 84b is in the shape of approximately half of a ring and extends around approximately half of the first and second pathways 40 and 42. The seals 84a and 84b are preferably made from metal, such as chrome, treated steel, or cast iron, and have a rectangular cross-section.

While a number of seals have been described above in connection with the exemplary embodiment, one skilled in the art will understand that more or fewer seals could be used and positioned in different locations in accordance with the present invention.

Referring to FIG. 1, first rotor and shaft assembly 14 includes a shaft 88 that passes through the opening 34 of first rotor housing 18 and the aligned openings of second and third rotor housings 20 and 22. Three rotors mounted to shaft 88 correspond with and are housed by first, second, and third rotor housings 18, 20, and 22. The rotor within truncated cylinder 24 of first rotor housing 18 is shown as reference numeral 90 in FIGS. 4-11 and is described in detail below. Second rotor and shaft assembly 16 also includes a shaft 94 that passes through the aligned openings of first, second, and third rotor housings 18, 20, and 22. Shaft 94 is spaced apart from and is parallel to shaft 88. Three rotors mounted to shaft 94 correspond with and are housed by first, second, and third housings 18, 20, and 22. The rotor within truncated cylinder 26 of first rotor housing 18 is shown as reference numeral 96 in FIGS. 4-8. A gear 92 is mounted to the end of shaft 88, and another gear 98 is mounted to the end of shaft 94. Gears 92 and 98 have substantially equal diameters and engage each other such that shafts 88 and 94 rotate at the same time, at the same speed, and in opposite directions.

Figure 8:
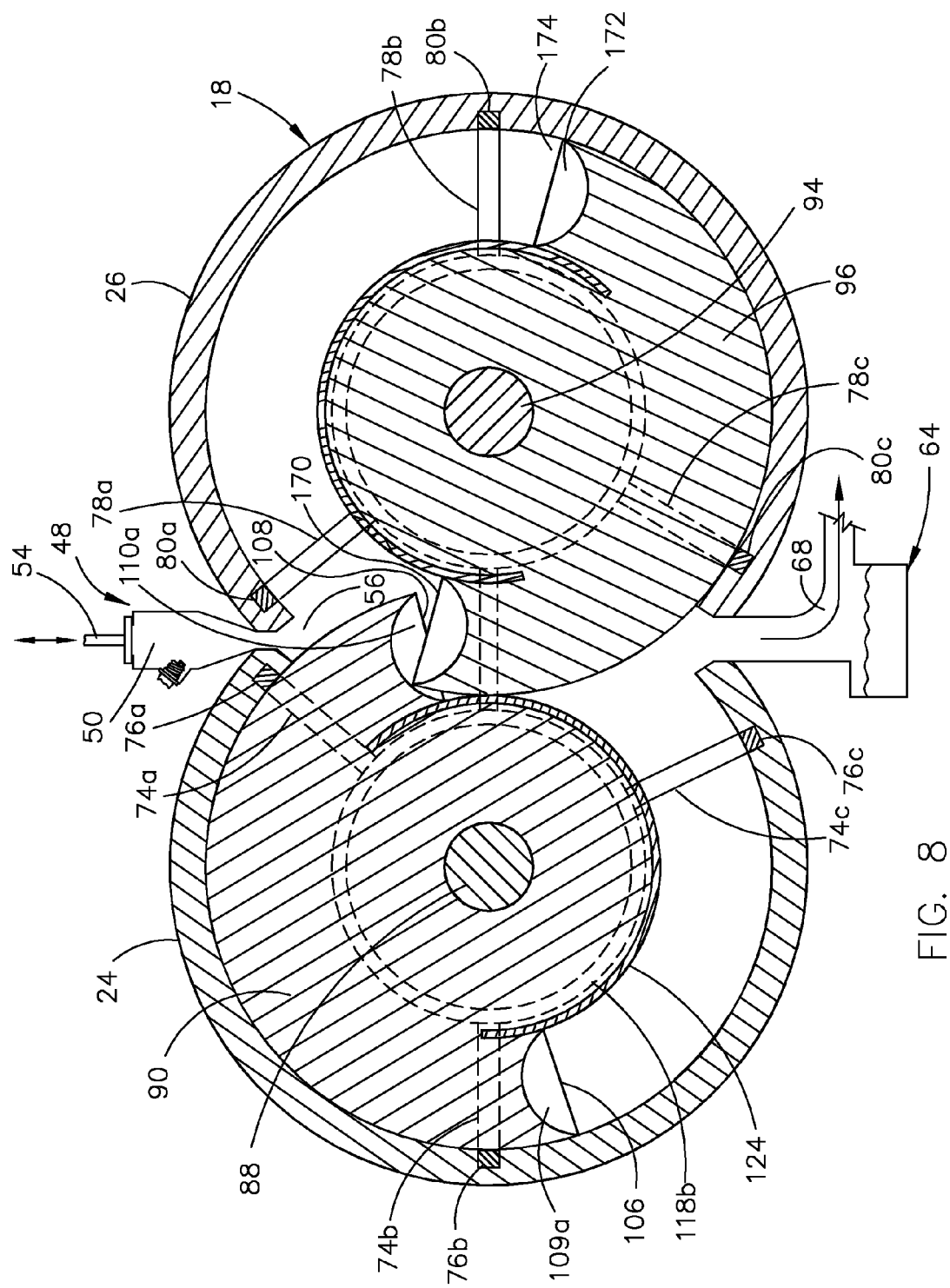
FIG. 8 is a cross-sectional view similar to FIG. 4 but showing the first and second rotors in a second overlapping position.
Figure 9:
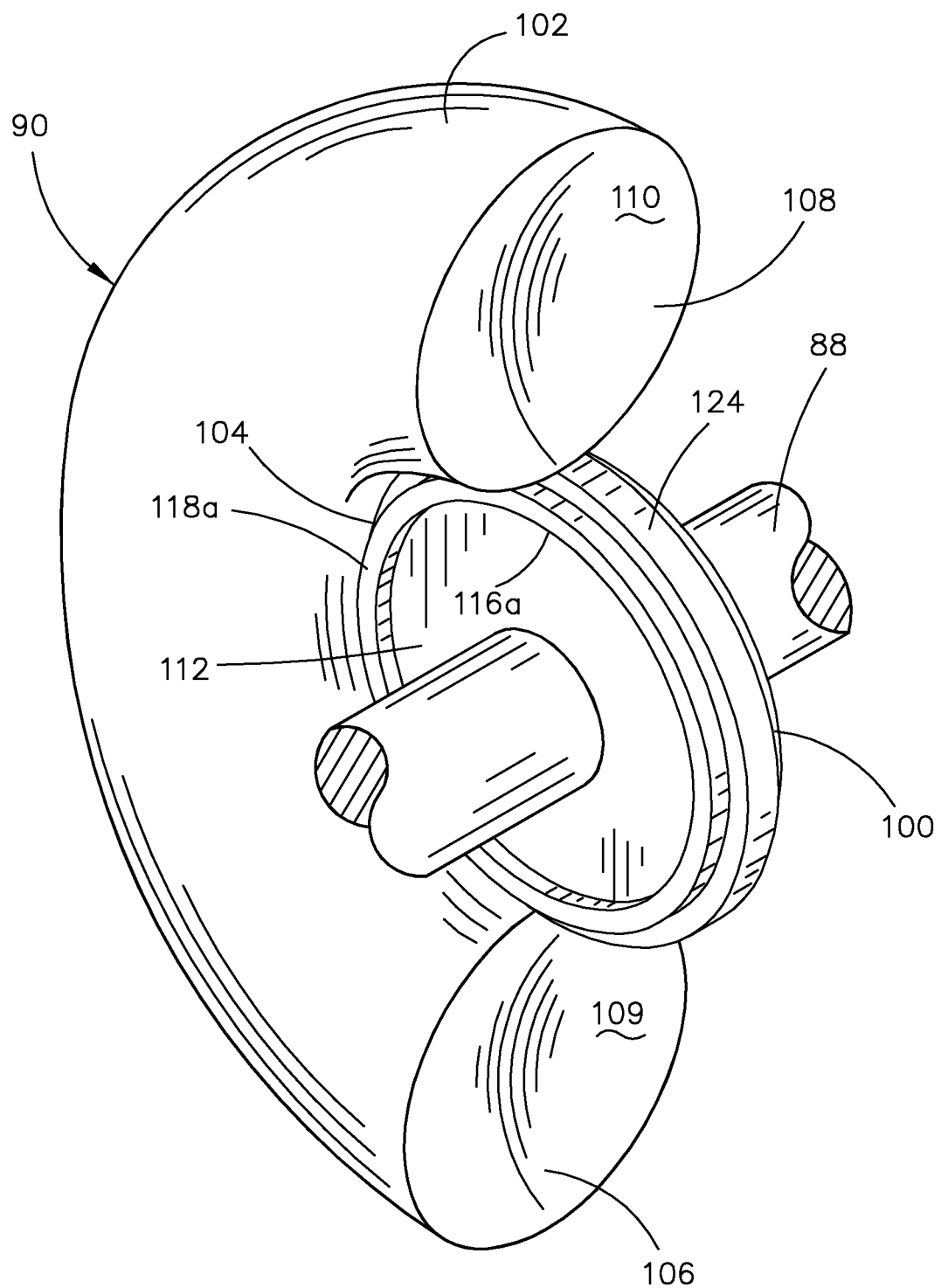
FIG. 9 is a perspective view of the first rotor.
Figure 11:
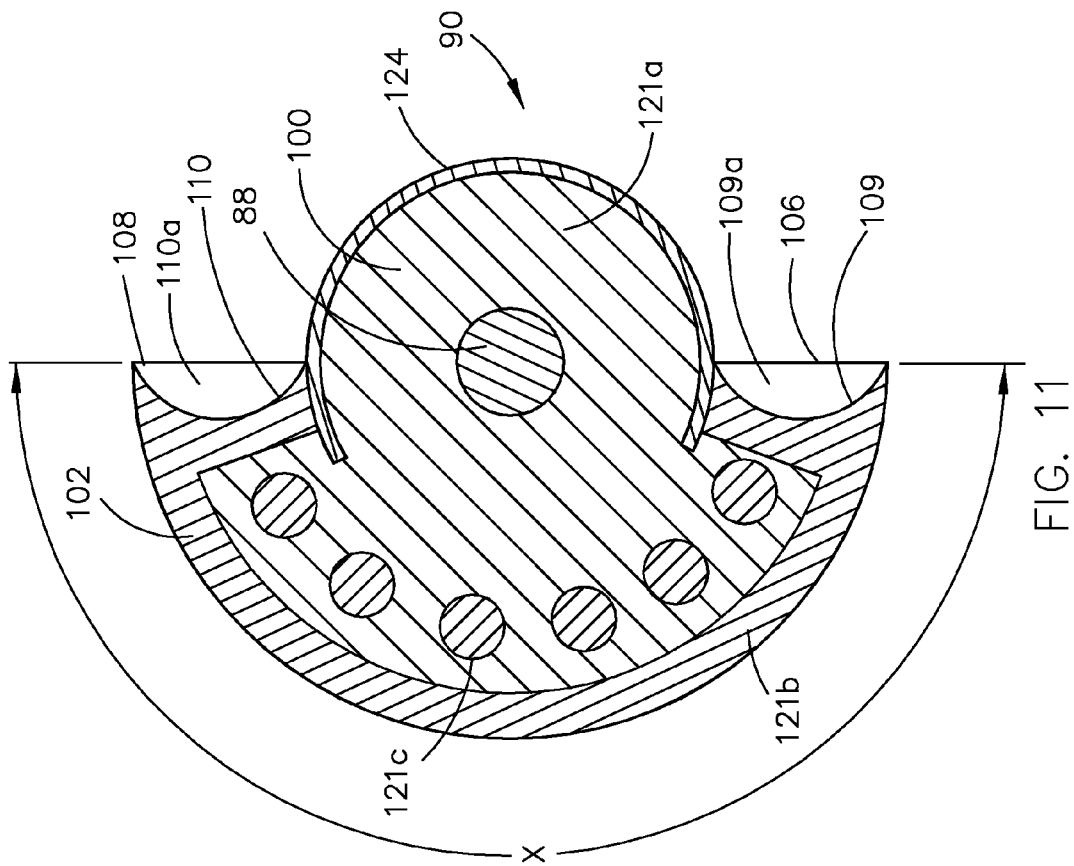
FIG. 11 is a cross-sectional view taken through the line 11-11 in FIG. 10.

Rotor 90 is described in detail with reference to FIGS. 9-11. One skilled in the art will understand that the structures of rotor 96 and the other rotors mounted to shafts 88 and 94 are not described in detail herein because those rotors are substantially similar to rotor 90. Rotor 90 includes a central disc 100 and a partial torus 102 extending outward from a peripheral edge 104 of the central disc 100. The central disc 100 includes a central opening that receives shaft 88 and is joined to shaft 88 in any suitable manner. For example, central disc 100 and shaft 88 may be joined by welding or with a key received by aligned keyways in the central disc 100 and shaft 88. The partial torus 102 includes a leading end 106 and a trailing end 108. The leading end 106 includes a concave surface 109. The concave surface 109 surrounds a cavity 109a shown in FIG. 11. The trailing end 108 also includes a concave surface 110. The concave surface 110 surrounds a cavity 110a as shown in FIG. 11. Cavities 109a and 110a are formed to avoid interference between rotors 90 and 96 when rotors 90 and 96 are in the positions shown in FIGS. 7 and 8 described below. Preferably, the angle X (FIG. 11) between the leading end 106 and the trailing end 108 is as close as possible to 180 degrees without causing rotors 90 and 96 to interfere with each other as they move within first and second pathways 40 and 42. For example, the angle X between the leading end 106 and the trailing end 108 may be between approximately 178 to 179.9 degrees, between approximately 178 to 179 degrees, or any of the following degrees: 179.9, 179.8, 179.7, 179.6, 179.5, 179.4, 179.3, 179.2, 179.1, 179.0, 178.9, 178.8, 178.7, 178.6, 178.5, 178.4, 178.3, 178.2, 178.1, or 178.0.

As shown in FIG. 5, central disc 100 has opposed sides 112 and 114. Annular recesses 116a and 116b are formed in the sides 112 and 114, respectively, adjacent peripheral edge 104. Annular seals 118a and 118b are received by the recesses 116a and 116b, respectively, and protrude slightly outward from sides 112 and 114. The seals 118a and 118b are preferably rings made from metal, such as chrome, treated steel, or cast iron, and have a rectangular cross-section. Rotor 96 includes seals 120a and 120b that are substantially similar to seals 118a and 118b.

Figure 10:
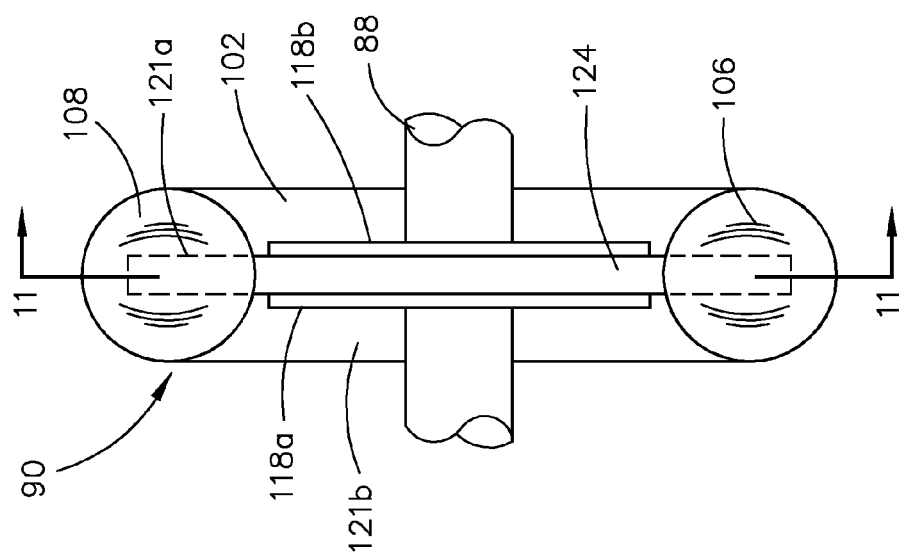
FIG. 10 is a front elevational view of the first rotor of FIG. 9.

Referring to FIGS. 10 and 11, rotor 90 is preferably formed from two different materials, namely, a metal plate 121a and ceramic 121b that is cast or molded around a portion of the metal plate 121a. Metal plate 121a forms all of central disc 100 and extends outward from central disc 100 to form a portion of the interior of torus 102. Ceramic 121b forms the outer surface of torus 102 by encapsulating the portion of metal plate 121a positioned within the interior of torus 102. Metal plate 121a is preferably a flat plate with a uniform thickness that is machined to have the structure shown in FIG. 11. A plurality of holes 121c are preferably formed in the portion of metal plate 121a positioned within the interior of torus 102. Ceramic 121b fills the holes 121c to assist in bonding metal plate 121a and ceramic 121b and strengthen rotor 90. As shown in FIGS. 10 and 11, the portion of metal plate 121a positioned within torus 102 does not extend to the outer surface of torus 102 such that metal plate 121a is not visible within torus 102. Ceramic 121b is preferably cast or molded around metal plate 121a after metal plate 121a is machined. Forming the outer portion of rotor 90 from ceramic 121b having a high thermal resistance is desirable when rotor 90 is exposed to high temperatures within engine 10. FIGS. 4-8 do not show the two material structure of rotor 90 as shown in FIG. 11 and described above for purposes of clarity in understanding the positioning of rotor 90 in FIGS. 4-8. Rotor 96 and the other rotors mounted to shafts 88 and 94 preferably have the same two material structures as shown in FIG. 11 and described above. It is within the scope of the invention, however, for rotors 90 and 96 to be entirely formed from a single material such as any type of metal.

Referring to FIG. 4, rectangular slots 122a and 122b are formed within the leading and trailing ends 106 and 108, respectively, of the partial torus 102 adjacent the peripheral edge 104 of central disc 100. The slots 122a and 122b receive the ends of a half-ring shaped seal 124, which has a rectangular cross-section. Seal 124 is preferably longer than the circumferential distance between slots 122a and 122b such that it extends slightly outward from peripheral edge 104. Seal 124 is preferably formed from metal, such as chrome, treated steel, or cast iron. Rotor 96 includes a seal 126 that is substantially similar to seal 124.

Referring to FIG. 1, the two rotors mounted to shaft 88 that correspond with and are housed by second and third rotor housings 20 and 22 are angularly offset from each other and from rotor 90 by approximately 120 degrees. Thus, the leading end 106 of rotor 90 is offset from the leading ends of the other two rotors corresponding to second and third rotor housings 20 and 22 by approximately 120 degrees, and the leading ends of the rotors corresponding to second and third rotor housings 20 and 22 are offset by approximately 120 degrees. Similarly, the two rotors mounted to shaft 94 that correspond with and are housed by second and third rotor housings 20 and 22 are angularly offset from each other and from rotor 96 by approximately 120 degrees. Thus, the leading end of rotor 96 is offset from the leading ends of the other two rotors corresponding to second and third rotor housings 20 and 22 by approximately 120 degrees, and the leading ends of the rotors corresponding to second and third rotor housings 20 and 22 are offset by approximately 120 degrees. The rotors are offset from each other in this manner to reduce vibration of engine 10.

One skilled in the art will appreciate that more or less than three rotors could be mounted to each of the shafts 88 and 94 and for the block 12 to have the same number of corresponding rotor housings. Preferably, the angular offset between rotors joined to the same one of shafts 88 and 94 is 360 degrees divided by the number of rotors mounted to the shaft. For example, if engine 10 only has first and second rotor housings 18 and 20, the rotors within first rotor housing 18 are preferably offset from the rotors within second rotor housing 20 by 180 degrees.

Referring to FIGS. 4 and 5, rotor 90 is positioned within first rotor housing 18 such that partial torus 102 is positioned within first pathway 40 and a portion of central disc 100 is received by the ring-shaped slot 44 (as shown in FIG. 5). Shaft 88 is centered within the opening 34 of truncated cylinder 24. The other rotors (not shown) joined to shaft 88 are positioned within second and third rotor housings 20 and 22 in a similar manner as described herein with respect to rotor 90 and first rotor housing 18. Rotor 96 is positioned within first rotor housing 18 such that its partial torus is positioned within second pathway 42 and a portion of its central disc is received by ring-shaped slot 46 (as shown in FIG. 5). Shaft 94 is centered within the opening of truncated cylinder 26. The other rotors (not shown) joined to shaft 94 are positioned within second and third rotor housings 20 and 22 in a similar manner as described herein with respect to rotor 96 and first rotor housing 18. Rotors 90 and 96 are inserted into first and second pathways 40 and 42, respectively, when the truncated cylinders 24 and 26 are separated. After the rotors 90 and 96 are inserted into the pathways 40 and 42, the truncated cylinders 24 and 26 may be joined using any means known in the art.

The seals 76a, 76b, 76c, 80a, 80b, 80c, 84a and 84b are sized such that they exert pressure on rotors 90 and 96 when the rotors are in contact with the seals. Seals 118, 118b, 120a and 120b are sized so that they exert pressure on the walls of the first rotor housing 18 adjacent the seals. Seals 124 and 126 are sized so that they exert pressure on rotors 96 and 90, respectively, when the seals make contact with the rotors.

Referring to FIGS. 4 and 6, it can be seen that rotors 90 and 96 are positioned with respect to each other such that each rotor is offset approximately 180 degrees from the mirror image of the other. That is, when rotor 90 is rotated within truncated cylinder 24 approximately 180 degrees from the position shown in FIG. 4 to the position shown in FIG. 6, rotor 90 as shown in FIG. 6 is oriented so that it is the mirror image of rotor 96 as shown in FIG. 4. Similarly, when rotor 96 is rotated within truncated cylinder 26 approximately 180 degrees from the position shown in FIG. 4 to the position shown in FIG. 6, rotor 96 as shown in FIG. 6 is oriented so that it is the mirror image of rotor 90 as shown in FIG. 4. The rotors 90 and 96 are offset approximately 180 degrees to complement each other in operation of engine 10 as described in more detail below. The rotors (not shown) within second rotor housing 20 and the rotors (not shown) within third rotor housing 22 are offset 180 degrees from each other in a similar manner as the rotors 90 and 96.

Referring to FIG. 5, in the exemplary embodiment, one end of shaft 88 is coupled to an electric generator 128 for generating electric energy from the rotation of shaft 88. Electric generator 128 preferably supplies electric energy to one or more electric motors coupled with the drive train of a vehicle. Alternatively, electric generator 128 may be omitted and shaft 88 may be coupled directly with the drive train of a vehicle. Also, one end of shaft 94 is coupled to an air compressor 130, which supplies compressed air to the intake assembly 48 (shown in FIG. 4) as described in more detail below in order to increase the energy generated by engine 10 as is known in the art. Electric generator 128 and air compressor 130 are not shown in FIGS. 1-3 and 12.

Figure 12:
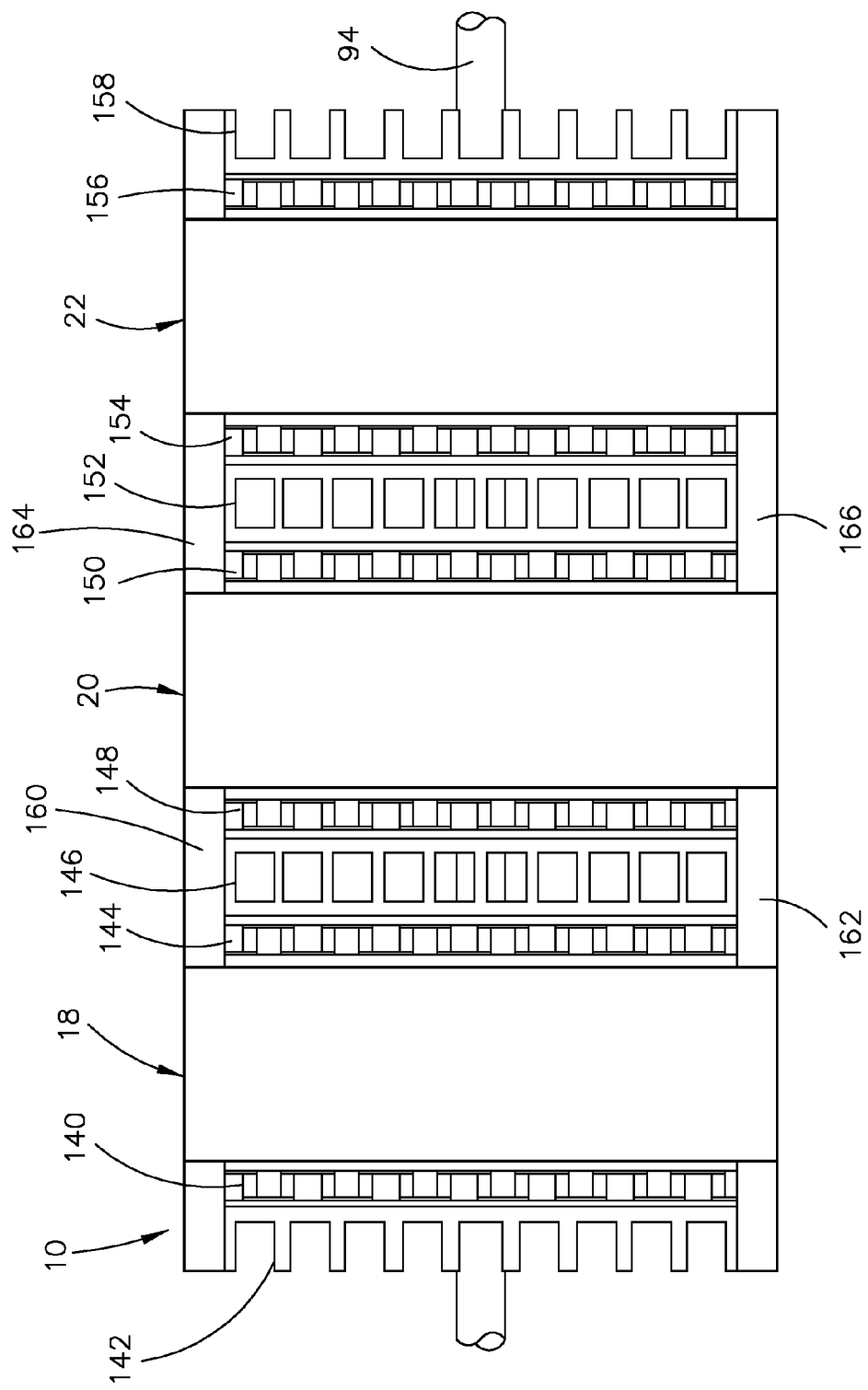
FIG. 12 is a front elevational view of the engine of FIG. 1 showing the thermoelectric device arrays and heat sinks positioned between the rotor housings.

Referring to FIG. 12, in the exemplary embodiment, an array of thermoelectric devices 140 is positioned between the first rotor housing 18 and a heat sink 142 and an array of thermoelectric devices 144 is positioned between the first rotor housing 18 and a heat sink 146. Thermoelectric device arrays 140 and 144 convert heat from the first rotor housing 18 into electric energy. Also, an array of thermoelectric devices 148 is positioned between the second rotor housing 20 and the heat sink 146 and an array of thermoelectric devices 150 is positioned between the second rotor housing 20 and a heat sink 152. Thermoelectric device arrays 148 and 150 convert heat from the second rotor housing 20 into electric energy. In addition, an array of thermoelectric devices 154 is positioned between the third rotor housing 22 and the heat sink 152 and an array of thermoelectric devices 156 is positioned between the third rotor housing 22 and a heat sink 158. Thermoelectric device arrays 154 and 156 convert heat from the third rotor housing 22 into electric energy. The thermoelectric device arrays and heat sinks are not shown in FIGS. 1-3 and 5. The preferred configuration of thermoelectric device arrays 140, 144, 148, 150, 154 and 156 is described in detail below in Section IV titled "THERMOELECTRIC DEVICES" with reference to FIGS. 14 and 15. Of course, one skilled in the art will understand that other thermoelectric device configurations are also possible and within the scope of the present invention.

Referring still to FIG. 12, a mount 160 extends between the top portions of the first rotor housing 18 and second rotor housing 20 and is preferably joined to the first rotor housing 18 and second rotor housing 20 in any suitable manner. Another mount 162 extends between the bottom portions of the first rotor housing 18 and second rotor housing 20 and is preferably joined to the first rotor housing 18 and second rotor housing 20 in any suitable manner. Mounts 160 and 162 couple together the first rotor housing 18 and second rotor housing 20. Likewise, a mount 164 extends between the top portions of the second rotor housing 20 and third rotor housing 22 and is preferably joined to the second rotor housing 20 and third rotor housing 22 in any suitable manner. Another mount 166 extends between the bottom portions of the second rotor housing 20 and third rotor housing 22 and is preferably joined to the second rotor housing 20 and third rotor housing 22 in any suitable manner. Mounts 164 and 166 couple together the second rotor housing 20 and third rotor housing 22. Mounts 160, 162, 164 and 166 are not shown in FIGS. 1-3.

II. Operation of Engine

An exemplary operation of engine 10 in accordance with the present invention will be described with reference to FIGS. 4, 6, 7, and 8. In operation, first and second rotors 90 and 96 rotate within the first and second pathways 40 and 42, respectively. FIG. 4 shows the first and second rotors 90 and 96 in a first combustion position, and FIG. 6 shows the first and second rotors 90 and 96 in a second combustion position (wherein the rotors are rotated approximately 180 degrees from the first combustion position). The first rotor 90 rotates in the counter-clockwise direction as viewed in FIG. 4, and the second rotor 96 rotates in the clockwise direction as viewed in FIG. 4. Because the first and second rotors 90 and 96 are coupled together via shafts 88 and 94 and gears 92 and 98 (as shown in FIG. 1), the first and second rotors 90 and 96 are in the first combustion position at approximately the same time (as shown in FIG. 4) and are also in the second combustion position at approximately the same time (as shown in FIG. 6).

When the first and second rotors 90 and 96 are in the first combustion position, as shown in FIG. 4, a first combustion chamber 132 is formed within first pathway 40 between the first and second rotors 90 and 96. First combustion chamber 132 is in fluid communication with intake 56. In operation, valve 54 opens to allow pressurized air from air compressor 130 mixed with fuel to enter plenum 50 and combustion chamber 132. Valve 54 closes, and spark plug 62 ignites the air/fuel mixture within combustion chamber 132. The energy generated by combustion of the air/fuel mixture within combustion chamber 132 is transferred to rotor 90 and shaft 88 as the combusted air/fuel mixture expands and rotor 90 rotates in the counter-clockwise direction. Rotation of shaft 88 generates electric energy within electric generator 128, and also compresses air within air compressor 130 via the geared connection between shafts 88 and 94.

When the air/fuel mixture within combustion chamber 132 ignites, truncated cylinder 24, valve 54, rotors 90 and 96, and seals 76a, 76b, 84a, 84b, 118a, 118b and 124 seal the combustion chamber 132 to prevent the expanding air/fuel mixture from exiting the combustion chamber 132. A portion of second rotor 96 is in the location where the first and second pathways 40 and 42 intersect in order to act as a valve that prevents the air/fuel mixture from entering second pathway 42.

Seals 76a, 76b and 76c are positioned within first pathway 40 between the partial torus 102 of first rotor 90 and truncated cylinder 24 to prevent the ignited air/fuel mixture from escaping between first rotor 90 and the wall of truncated cylinder 24 surrounding first pathway 40. When the trailing end 108 of rotor 90 moves past seal 76a, seal 76b prevents the ignited air/fuel mixture from escaping between first rotor 90 and truncated cylinder 24. When the trailing end 108 of rotor 90 moves past seal 76b, as shown in FIG. 6, seal 76c prevents the ignited air/fuel mixture from escaping between first rotor 90 and truncated cylinder 24. After the trailing end 108 of rotor 90 moves past seal 76c, the majority of the energy generated by the combustion of the air/fuel mixture has been transferred to rotor 90. Thus, the combusted air/fuel mixture can flow around rotor 90 to exhaust 70 without substantial energy loss.

Referring to FIG. 5, when the first and second rotors 90 and 96 are in the first combustion position (as shown in FIG. 4), seals 84a and 84b are positioned between the partial torus of the second rotor 96 and the first rotor housing 18 to prevent the ignited air/fuel mixture within combustion chamber 132 from escaping between second rotor 96 and the first rotor housing 18. Seals 118a and 118b are positioned between the sides 112 and 114, respectively, of central disc 100 and first rotor housing 18 to prevent the ignited air/fuel mixture within combustion chamber 132 from escaping between central disc 100 and first rotor housing 18. Seal 124 is positioned between the peripheral edge 104 of the central disc 100 of first rotor 90 and the partial torus of the second rotor 96 to prevent the ignited air/fuel mixture within combustion chamber 132 from escaping between the first and second rotors 90 and 96.

When the rotors 90 and 96 rotate from the first combustion position shown in FIG. 4 to the second combustion position shown in FIG. 6, a second combustion chamber 134 is formed within second pathway 42 between the first and second rotors 90 and 96. Second combustion chamber 134 is in fluid communication with intake 56. In operation, valve 54 opens to allow pressurized air from air compressor 130 mixed with fuel to enter plenum 50 and combustion chamber 134. Valve 54 closes, and spark plug 62 ignites the air/fuel mixture within combustion chamber 134. The energy generated by combustion of the air/fuel mixture within combustion chamber 134 is transferred to rotor 96 and shaft 94 as the combusted air/fuel mixture expands and rotor 96 rotates in the clockwise direction. Rotation of shaft 94 compresses air within air compressor 130, and also generates electric energy within electric generator 128 via the geared connection between shafts 88 and 94.

When the air/fuel mixture within combustion chamber 134 ignites, truncated cylinder 26, valve 54, rotors 90 and 96, and seals 80a, 80b, 84a, 84b, 120a, 120b and 126 seal the combustion chamber 134 to prevent the expanding air/fuel mixture from exiting the combustion chamber 134. A portion of first rotor 90 is in the location where the first and second pathways 40 and 42 intersect in order to act as a valve that prevents the air/fuel mixture from entering first pathway 40.

Seals 80a, 80b and 80c are positioned within second pathway 42 between the partial torus of second rotor 96 and truncated cylinder 26 to prevent the ignited air/fuel mixture from escaping between second rotor 96 and the wall of truncated cylinder 26 surrounding second pathway 42. When the trailing end of rotor 96 moves past seal 80a, seal 80b prevents the ignited air/fuel mixture from escaping between second rotor 96 and truncated cylinder 26. When the trailing end of rotor 96 moves past seal 80b, seal 80c prevents the ignited air/fuel mixture from escaping between second rotor 96 and truncated cylinder 26. After the trailing end of rotor 96 moves past seal 80c, the majority of the energy generated by the combustion of the air/fuel mixture has been transferred to rotor 96. Thus, the combusted air/fuel mixture can flow around rotor 96 to exhaust 70 without substantial energy loss.

Referring to FIG. 5, when the first and second rotors 90 and 96 are in the second combustion position (as shown in FIG. 6), seals 84a and 84b are positioned between the partial torus 102 of the first rotor 90 and the first rotor housing 18 to prevent the ignited air/fuel mixture within combustion chamber 134 from escaping between first rotor 90 and the first rotor housing 18. Seals 120a and 120b are positioned between the sides of second rotor 96 and first rotor housing 18 to prevent the ignited air/fuel mixture within combustion chamber 134 from escaping between second rotor 96 and first rotor housing 18. Seal 126 is positioned between the peripheral edge of the central disc of second rotor 96 and the partial torus 102 of first rotor 90 to prevent the ignited air/fuel mixture within combustion chamber 134 from escaping between the first and second rotors 90 and 96.

Figure 7:
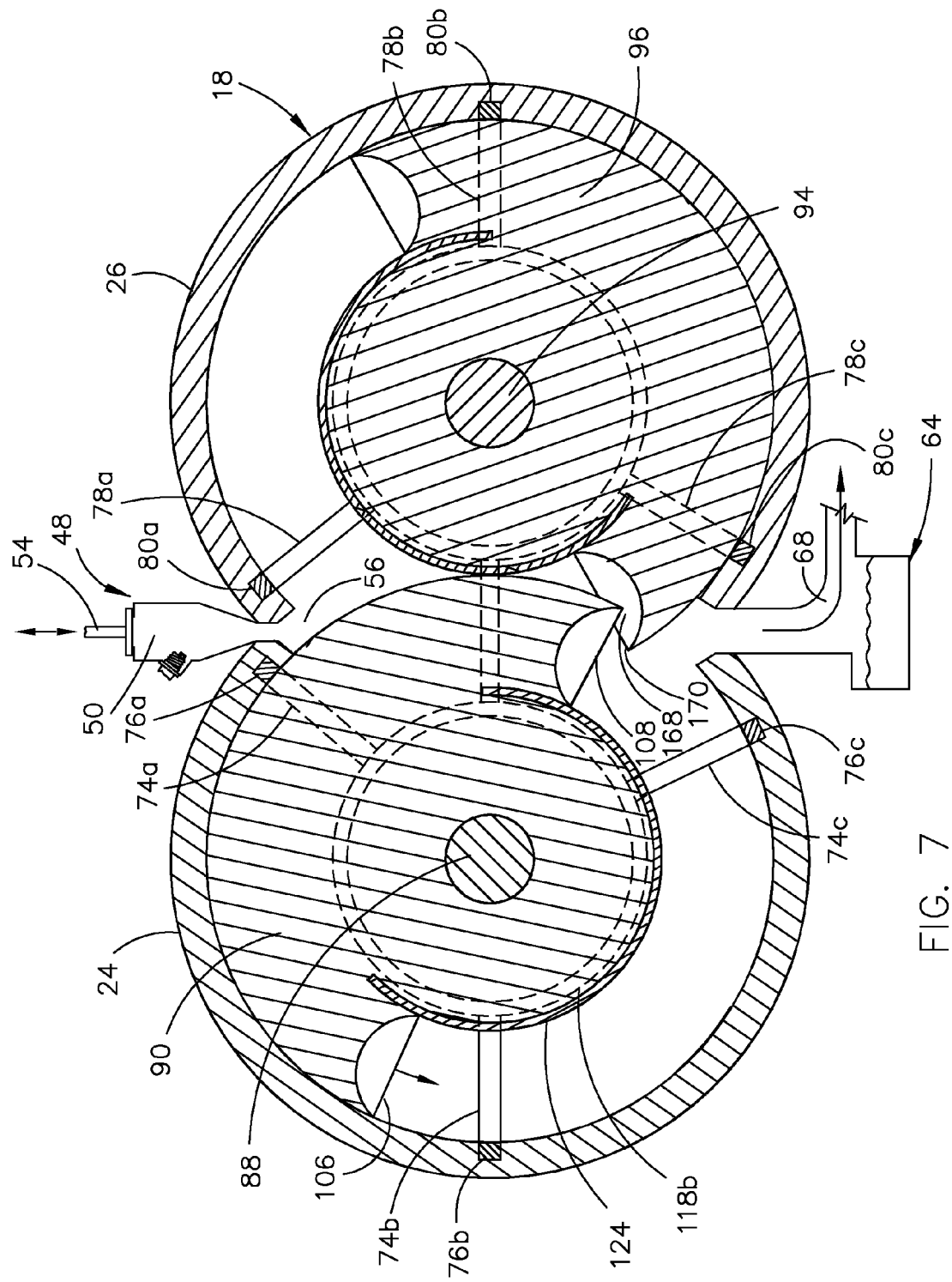
FIG. 7 is a cross-sectional view similar to FIG. 4 but showing the first and second rotors in a first overlapping position.

FIG. 7 shows the first and second rotors 90 and 96 in a first overlapping position, which is a position to which the rotors 90 and 96 move between the second combustion position shown in FIG. 6 and the first combustion position shown in FIG. 4. In the first overlapping position, a portion of the trailing end 108 of first rotor 90 is positioned within a cavity 168 formed in the leading end 170 of second rotor 96. FIG. 8 shows the first and second rotors 90 and 96 in a second overlapping position, which is a position between the first overlapping position shown in FIG. 7 and the first combustion position shown in FIG. 4. In the second overlapping position, a portion of the leading end 170 of second rotor 96 is received within the cavity 110a formed in the trailing end 108 of first rotor 90. The first and second rotors 90 and 96 also move into a third overlapping position (not shown), which is between the first combustion position shown in FIG. 4 and the second combustion position shown in FIG. 6, in which the trailing end of second rotor 96 is received within the cavity 109a formed in the leading end 106 of first rotor 90. The first and second rotors 90 and 96 further move into a fourth overlapping position (not shown), which is between the third overlapping position and the second combustion position shown in FIG. 6, in which the leading end 106 of first rotor 90 is received within a cavity 172 formed in the trailing end 174 of second rotor 96.

Cavities 109a and 110a (FIG. 11) are formed in the leading and trailing ends 106 and 108, respectively, of first rotor 90, and similar cavities 168 and 172 are formed in the leading and trailing ends 170 and 174, respectively, of second rotor 96. As such, either end of either rotor 90 and 96 can be at least partially received within one of the cavities 109a, 110a, 168, or 172 formed in an end of the other rotor 90 and 96 when the rotors 90 and 96 are in the first, second, third, and fourth overlapping positions. The cavities 109a, 110a, 168, and 172 allow adjacent ends of rotors 90 and 96 to overlap without interfering with each other. The cavities 109a, 110a, 168, and 172 are necessary to prevent interference between adjacent ends of rotors 90 and 96 because each of the rotors 90 and 96 has an angle X (FIG. 11) between its leading and trailing ends that is close to 180 degrees, as described above. The angle X between the leading and trailing ends of each of the rotors 90 and 96 is preferably as close as possible to 180 degrees in order to ensure that at least one of the rotors 90 and 96 engages the seals 84a and 84b to prevent unwanted leakage of an ignited air/fuel mixture past the seals 84a and 84b in any position of the rotors 90 and 96. The angle X between the leading and trailing ends of each of the rotors 90 and 96 is slightly less than 180 degrees so that the rotors 90 and 96 do not interfere with each other as they move within first and second pathways 40 and 42.

It is within the scope of the invention for the seals 76a, 76b and 76c and seals 80a, 80b and 80c to be omitted in the event that the rotors 90 and 96 are sized to fit so closely to the walls of the first rotor housing 18 surrounding the first and second pathways 40 and 42 that the combusted air/fuel mixture cannot escape between the rotors 90 and 96 and first rotor housing 18. In such an embodiment, the circumferential length of the partial torus portion of the rotors 90 and 96 assists in maintaining pressure within the combustion chambers 132 and 134.

The rotors (not shown) within the second and third rotor housings 20 and 22 operate in a similar manner as described above with respect to the rotors 90 and 96 within the first rotor housing 18. As described above, the rotors within the second rotor housing 20 are offset 120 degrees from the rotors 90 and 96. The rotors within the second rotor housing 20 move between third and fourth combustion positions when an air/fuel mixture is ignited within a combustion chamber formed within the second rotor housing 20. Likewise, the rotors within the third rotor housing 22 are offset 120 degrees from the rotors 90 and 96 and the rotors within the second rotor housing 20. Thus, the rotors within the third rotor housing 22 move between fifth and sixth combustion positions when an air/fuel mixture is ignited within a combustion chamber formed within the third rotor housing 22.

Referring to FIG. 4, the valves 54 associated with each of the first, second, and third rotor housings 18, 20, and 22 are preferably moved between their open and closed positions by a cam assembly (not shown). The cam assembly is coupled to shafts 88 and 94 and ensures that the valves are opened and closed at the appropriate times. Due to the configuration of engine 10, no valves are needed for the exhaust unlike many conventional internal combustion engines. Further, only one intake valve 54 is needed for each pair of rotors 90 and 96 unlike many conventional engines that require at least one intake valve for each piston/cylinder. The rotors within the first, second, and third rotor housings 18, 20, and 22 are offset by 120 degrees in the manner described above so that the energy output of shafts 88 and 94 is relatively constant over time.

Referring to FIG. 12, during operation, the temperature of engine 10 increases due to the combustion of the air/fuel mixture within the first, second, and third rotor housings 18, 20, and 22. At the same time, if the engine 10 is mounted within a moving vehicle, the vehicle may include a channel to divert air through block 12 between the first, second and third rotor housings 18, 20 and 22, which will cool the heat sinks 142, 146, 152 and 158. Fans (not shown) may also blow air through block 12 to assist in cooling. Preferably, engine 10 is mounted within a vehicle such that the portion of engine 10 shown in FIG. 12 faces the front of the vehicle so that air entering the vehicle as it moves can easily be directed into contact with and through heat sinks 142, 146, 152 and 158. As described in greater detail below, the heating of the rotor housings 18, 20 and 22 and the cooling of the heat sinks 142, 146, 152 and 158 due to the moving air results in a high change in temperature ($\Delta T$) between the plates of the thermoelectric device arrays 140, 144, 148, 150, 154 and 156 (i.e., $\Delta T = T_{rotor\ housing} - T_{heat\ sink}$). As such, the thermoelectric device arrays 140, 144, 148, 150, 154 and 156 are able to convert the heat energy into electric energy with high efficiency. The electric energy generated by the thermoelectric device arrays 140, 144, 148, 150, 154 and 156 is preferably added to the electric energy generated by the electric generator 128 (FIG. 5). It can be appreciated that the thermoelectric device arrays 140, 144, 148, 150, 154 and 156 also assist in cooling engine 10 by converting the heat energy into electric energy.

III. Efficiency of Engine

The efficiency of engine 10 is increased relative to that of conventional internal combustion engines for a number of reasons. For example, engine 10 operates efficiently because the energy generated by the combustion of the air/fuel mixture within combustion chambers 132 and 134 is continuously transferred to rotors 90 and 96, respectively, as the air/fuel mixture expands. Because the rotors 90 and 96 do not move in a direction that opposes the expansion of the combusted air/fuel mixture within combustion chambers 132 and 134, energy from the shafts 88 and 94 is not lost counteracting the expansion of the combusted air/fuel mixture. Further, by the time the combusted air/fuel mixture is able to exhaust from the engine 10, the majority of the energy has been transferred to rotors 90 and 96 because the volume of the combustion chambers 132 and 134 at the time of exhaustion is much greater than the volume of the combustion chambers 132 and 134 at the time of ignition, which means that the pressure within the combustion chambers 132 and 134 is relatively low at the time of exhaustion. It is believed that only between approximately 5% to 10% of the energy from the combustion of the air/fuel mixture is lost due to its exhaust from engine 10. The efficiency of engine 10 depends on the ratio of the cross-sectional diameter of partial torus 102 (FIG. 9) (i.e., the diameter of trailing end 108) to the stroke length of rotor 90, which is the distance that trailing end 108 of rotor 90 travels from the first combustion position shown in FIG. 4 to a position where the combusted air/fuel mixture in the first combustion chamber 132 begins to exit through exhaust 70. When the cross-sectional diameter of partial torus 102 is multiplied by an amount Y, the stroke length of rotor 90 must be multiplied by an amount $Y^2$ in order for engine 10 to have the same efficiency.

Conversion of the heat energy generated by engine 10 into electric energy by thermoelectric device arrays 140, 144, 148, 150, 154 and 156 also increases the efficiency of engine 10. It is believed that these thermoelectric device arrays are able to convert between approximately 20% to 70% of the heat energy from the rotor housings (which would otherwise be lost) into electric energy. Further, it is believed that the heat energy generated by engine 10 represents approximately 40% of the energy generated by the combustion of the air/fuel mixture. Thus, it is believed that these thermoelectric device arrays capture approximately between 8% to 28% of the energy generated by the combustion of the air/fuel mixture. It should be noted that the temperature of engine 10 during operation, while starting relatively low, may reach approximately 300° F. to 800° F. or higher.

The efficiency of engine 10 is further increased because it converts the mechanical energy of shafts 88 and 94 into electric energy through electric generator 128. When engine 10 is used in a vehicle, variable speed electric motors powered by the electric generator 128 may be used to power the vehicle's wheels, resulting in efficiency improvements over a conventional vehicle that utilizes a transmission to transfer energy from the engine to the wheels. It is believed that engine 10 may be greater than 50% efficient, preferably greater than 65% efficient, and most preferably between approximately 58% to 79% efficient at converting the energy generated by the combustion of the air/fuel mixture within the engine 10 into mechanical energy at shafts 88 and 94.

While the configuration of engine 10 is preferred insofar as it provides a number of different features that increase the efficiency of the engine, one skilled in the art will understand that any one of these features could be implemented without the others in accordance with the present invention. In other words, an engine could incorporate one or any combination of the following aspects of the present invention: rotors that do not move in a direction that opposes the expansion of the combusted air/fuel mixture within the combustion chambers; thermoelectric device arrays that convert heat energy from the rotor housings into electric energy; and/or an electric generator that converts mechanical energy from the shafts into electric energy.

Figure 13:
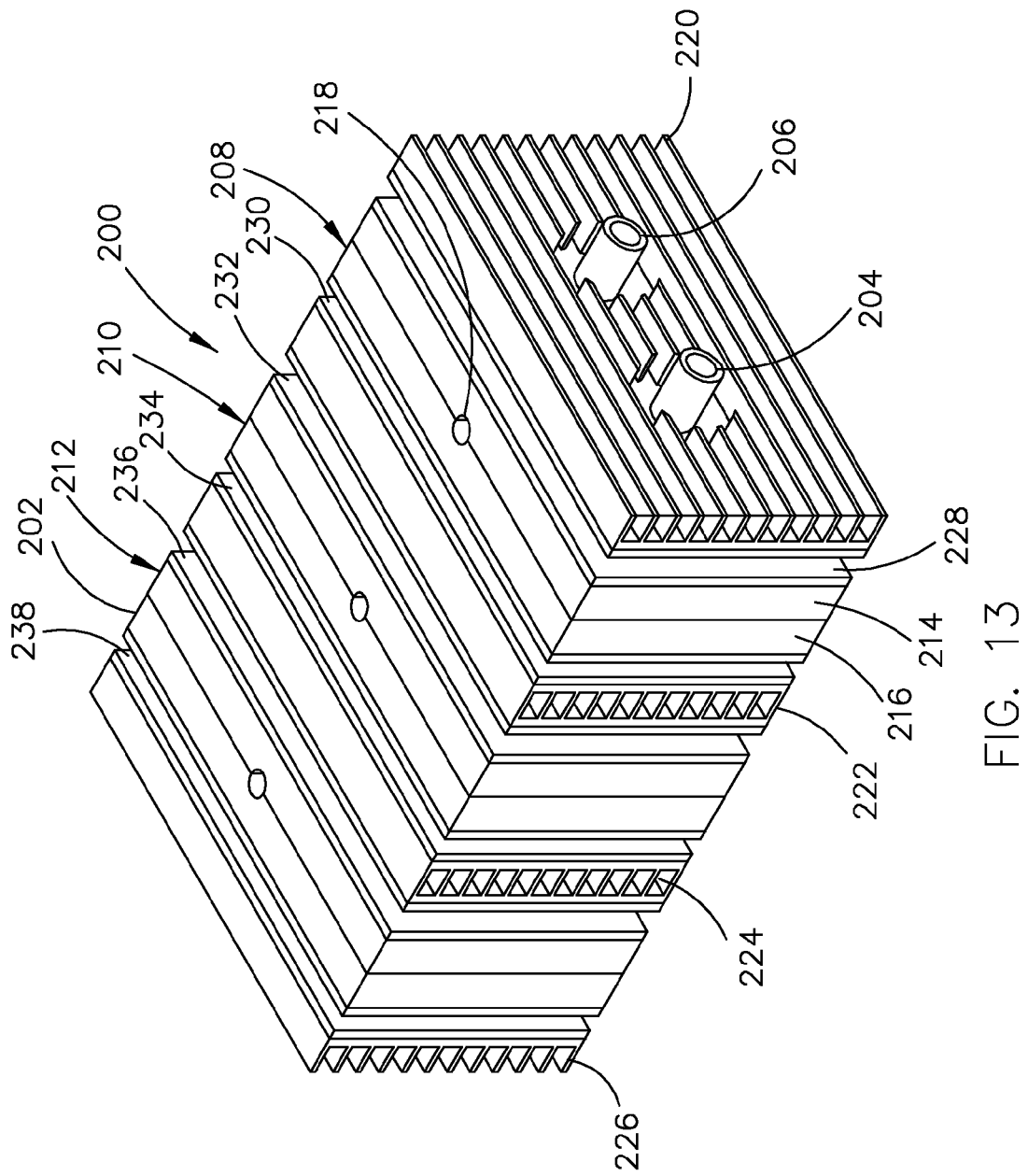
FIG. 13 is a perspective view of an alternative exemplary embodiment of an engine in accordance with the present invention.

Referring to FIG. 13, an alternative exemplary embodiment of an engine in accordance with the present invention is shown generally as reference numeral 200. Engine 200 includes a block 202 that is generally shaped as a rectangular cuboid. Engine 200 also includes a first rotor and shaft assembly 204 that is substantially similar to first rotor and shaft assembly 14, and a second rotor and shaft assembly 206 that is substantially similar to second rotor and shaft assembly 16. Block 202 includes first, second, and third rotor housings 208, 210, and 212, respectively. The first, second, and third rotor housings 208, 210, and 212 are substantially similar. Accordingly, only the first rotor housing 208 is described in detail herein.

First rotor housing 208 includes first and second halves 214 and 216 that abut each other. First and second halves 214 and 216 may be joined with fasteners or by any means known in the art. First and second intersecting pathways (not shown) are formed within the first and second halves 214 and 216 and preferably have the same configuration, respectively, as the first and second pathways 40 and 42 shown in FIG. 4. Half of the first pathway (not shown) of first rotor housing 208 is preferably formed in first half 214, and the other half of the first pathway (not shown) is preferably formed in second half 216. Likewise, half of the second pathway (not shown) is preferably formed in first half 214, and the other half of the second pathway (not shown) is preferably formed in second half 216. The first and second pathways (not shown) of engine 200 receive first and second rotors (not shown) that are substantially similar, respectively, to the first and second rotors 90 and 96 shown in FIG. 4. First rotor housing 208 includes an intake 218 to receive air and fuel in a similar manner as described above with respect to engine 10. Engine 200 also includes heat sinks 220, 222, 224, and 226 that are substantially similar to the heat sinks 142, 146, 152, and 158 shown in FIG. 12, and thermoelectric device arrays 228, 230, 232, 234, 236, and 238 that are substantially similar to thermoelectric devices 140, 144, 148, 150, 154, and 156 shown in FIG. 12. Engine 200 also preferably includes mating gears (not shown) to couple first and second rotor and shaft assemblies 204 and 206 in a similar manner as the gears 92 and 98 of engine 10. The first and second rotor and shaft assemblies 204 and 206 are preferably joined to an electric generator (not shown) and air compressor (not shown) in a similar manner as shown in FIG. 5 with respect to engine 10. One skilled in the art will understand that engine 200 operates in substantially the same manner as engine 10 described above and provides substantially the same efficiencies as engine 10. Of course, the greater surface area of heat sinks 220, 222, 224, and 226 provides a greater cooling effect than those of engine 10 such that engine 200 operates at a cooler temperature than engine 10. This results in a higher ΔT for the thermoelectric device arrays 228, 230, 232, 234, 236, and 238 and, thus, greater efficiency (as described in greater detail below).

IV. Thermoelectric Devices

The configuration of the thermoelectric devices in thermoelectric device arrays 140, 144, 148, 150, 154 and 156 will now be described in greater detail. One skilled in the art will appreciate that the thermoelectric devices could have a conventional configuration, such as the configuration shown in FIG. 14. However, it will be seen that greater efficiencies can be achieved with the configuration of the thermoelectric device shown in FIG. 15 in accordance with a preferred embodiment of the present invention.

Figure 14:
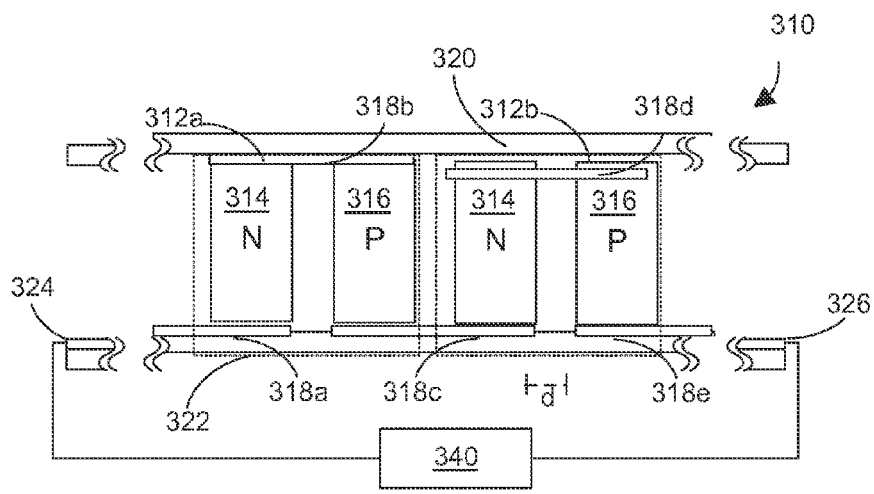
FIG. 14 is a diagram of a conventional thermoelectric device that may be used in the thermoelectric device arrays of FIG. 12.

Referring to FIG. 14, a conventional thermoelectric device is shown generally as reference numeral 310. Thermoelectric device 310 includes a plurality of thermoelectric couples 312a and 312b (only two of which are shown in FIG. 14). As shown, each thermoelectric couple comprises an n-type semiconductor element 314 and a p-type semiconductor element 316. The n-type and p-type semiconductor elements 314, 316 are electrically connected in series via connection plates 318a, 318b, 318c, 318d and 318e, as shown in FIG. 14. In addition, the n-type and p-type semiconductor elements 314, 316 are thermally connected in parallel between a top plate 320 and a bottom plate 322. Within each thermoelectric couple, the n-type and p-type semiconductor elements 314, 316 are spaced a short distance apart (represented by distance d in FIG. 14) in order to minimize the overall size of the device. For example, a typical distance between n-type and p-type semiconductor elements 314, 316 is in the range of 0.5 mm to 2.0 mm. Thermoelectric device 310 also includes contact points 324 and 326 that provide connections to a load 340. Heat from the rotor housings of engine 10 is applied to top plate 320 whereby electrical power is delivered to the load 340 connected to contact points 324 and 326.

The efficiency of thermoelectric device 310 increases with a greater temperature difference between top plate 320 and bottom plate 322. This is accomplished by selecting the materials of each of the n-type and p-type semiconductor elements 314, 316 to have a low thermal conductivity (e.g., a thermal conductivity of 0.026 W/cm° K or lower). However, materials with a low thermal conductivity generally have a low Seebeck coefficient (e.g., a Seebeck coefficient of 140 µV/° K to 250 µV/° K for the p-type semiconductor element and a Seebeck coefficient of −75 µV/° K to −200 µV/° K for the n-type semiconductor element). For example, $Bi_2Te_3$ is commonly used for the p-type semiconductor element 316, which has a thermal conductivity of about 0.020 W/cm° K and a Seebeck coefficient of about 240 µV/° K. Also, $Bi_2Te_3$+0.1% I is commonly used for the n-type semiconductor element 314, which has a thermal conductivity of about 0.0256 W/cm° K and a Seebeck coefficient of about −184 µV/° K. In addition, materials with a low thermal conductivity generally have a low electrical conductivity, which does not provide optimum efficiency. While efforts have been made to develop materials with a low thermal conductivity and higher Seebeck coefficients and electrical conductivity, there are still limits on the efficiency that can be achieved with the use of these materials. In particular, the efficiency of conventional thermoelectric device 310 is typically less than about 15%.

Figure 15:
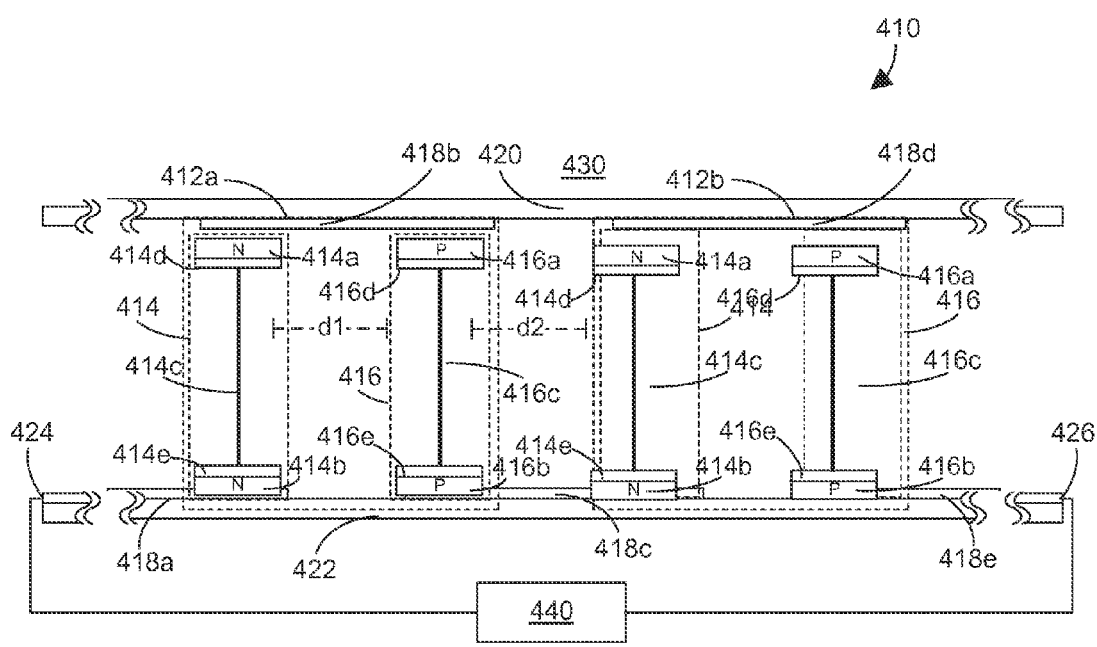
FIG. 15 is a diagram of a preferred thermoelectric device that may be used in the thermoelectric device arrays of FIG. 12.

Referring to FIG. 15, a thermoelectric device in accordance with the preferred embodiment of the present invention is shown generally as reference numeral 410. Thermoelectric device 410 includes a plurality of thermoelectric couples 412a, 412b positioned between a top plate 420 and a bottom plate 422. While two thermoelectric couples 412a, 412b are depicted in FIG. 15, it should be understood that thermoelectric device 410 may include any number of thermoelectric couples. In one aspect, the thermoelectric couples are arranged in a grid pattern, such as a square grid pattern in which thermoelectric device 410 has the same number of element assemblies along its length and width. Of course, other patterns of element assemblies may also be used. In another aspect, multiple thermoelectric devices or modules are connected in series and/or in parallel as desired for a particular application or to achieve a desired result.

In this embodiment, all of the thermoelectric couples are substantially identical, e.g., the configuration of thermoelectric couple 412a is substantially the same as the configuration of thermoelectric couple 412b. Each thermoelectric couple includes an n-type element assembly 414 and a p-type element assembly 416. The thermoelectric couples are electrically connected in series via connection plates 418a, 418b, 418c, 418d and 418e, as shown, such that the device electrically alternates between an n-type element assembly 414 and a p-type element assembly 416. As can be seen, the thermoelectric couples are thermally connected in parallel between top plate 420 and bottom plate 422.

Each n-type element assembly 414 comprises two n-type semiconductor elements 414a, 414b with connection plates 414d, 414e, respectively, connected in series by an electrical conductor 414c. N-type semiconductor elements 414a, 414b are thermally connected in series between top plate 420 and bottom plate 422. Similarly, each p-type element assembly 416 comprises two p-type semiconductor elements 416a, 416b with connection plates 416d, 416e, respectively, connected in series by an electrical conductor 416c. P-type semiconductor elements 416a, 416b are thermally connected in series between top plate 420 and bottom plate 422.

N-type semiconductor elements 414a, 414b are formed of a semiconductor material that has been doped with certain compounds such that the semiconductor material has an excess of negative electron charge carriers. One skilled in the art will understand that the specific material properties (e.g., Seebeck coefficient, thermal conductivity, and electrical resistivity) of n-type semiconductor elements 414a, 414b will vary depending on the semiconductor material used in the device. As described in detail below, the efficiency of thermoelectric device 410 may be increased by selecting a semiconductor material for n-type semiconductor elements 414a, 414b that has a large negative value for the Seebeck coefficient at the temperature at which the device will be operated and a relatively small value for the electrical resistivity. In a preferred embodiment, n-type semiconductor elements 414a, 414b are formed of a material in which the negative value for the Seebeck coefficient is greater than about −250 µV/° K, e.g., −250, −300, −350, −400, −450, −500, −550, −600, −650, −700, −750, −800, −850, −900, −950, −1000, −1050, −1100, −1150, −1200, −1250, −1300 or greater µV/° K. Also, in a preferred embodiment, n-type semiconductor elements 414a, 414b are formed of a material in which the electrical resistivity is less than about $1.0 \times 10^{-1}$ ohms·cm, more preferably less than about $1.0 \times 10^{-2}$ ohms·cm, and most preferably less than about $1.0 \times 10^{-3}$ ohms·cm. While a lower electrical resistivity is generally preferred, the value of the electrical resistivity must be considered relative to the value of the Seebeck coefficient. For example, a material with a higher electrical resistivity and higher Seebeck coefficient may be preferred over another material with a lower electrical resistivity and lower Seebeck coefficient. Suitable materials for n-type semiconductor elements 414a, 414b include, but are not limited to, $Bi_2S_3$ (sintered), $Pb_{09}Ge_{33}Se_{58}$, and $Pb_{15}Ge_{37}Se_{58}$. Unlike conventional thermoelectric devices, the thermal conductivity of the semiconductor material is not critical to the efficiency of thermoelectric device 410. Thus, n-type semiconductor elements 414a, 414b may be formed of a material in which the thermal conductivity is greater than about 0.10 W/cm ° K, e.g., 0.10, 0.12, 0.14, 0.16, 0.18, 0.20, 0.22, 0.24 or greater W/cm ° K.

P-type semiconductor elements 416a, 416b are formed of a semiconductor material that has been doped with certain compounds such that the semiconductor material has an excess of charge carriers (holes). One skilled in the art will understand that the specific material properties (e.g., Seebeck coefficient, thermal conductivity, and electrical resistivity) of p-type semiconductor elements 416a, 416b will vary depending on the semiconductor material used in the device. As described in detail below, the efficiency of thermoelectric device 410 may be increased by selecting a semiconductor material for p-type semiconductor elements 416a, 416b that has a large positive value for the Seebeck coefficient at the temperature at which the device will be operated and a small value for each of the thermal conductivity and electrical resistivity. In a preferred embodiment, p-type semiconductor elements 416a, 416b are formed of a material in which the positive value for the Seebeck coefficient is greater than about 250 µV/° K, e.g., 250, 300, 350, 400, 450, 500, 550, 600, 650, 700, 750, 800, 850, 900, 950, 1000, 1050, 1100, 1150, 1200, 1250, 1300 or greater µV/° K. Also, in a preferred embodiment, p-type semiconductor elements 416a, 416b are formed of a material in which the electrical resistivity is less than about $1.0 \times 10^{-1}$ ohms·cm, more preferably less than about $1.0 \times 10^{-2}$ ohms·cm, and most preferably less than about $1.0 \times 10^{-3}$ ohms·cm. While a lower electrical resistivity is generally preferred, the value of the electrical resistivity must be considered relative to the value of the Seebeck coefficient. For example, a material with a higher electrical resistivity and higher Seebeck coefficient may be preferred over another material with a lower electrical resistivity and lower Seebeck coefficient. Suitable materials for p-type semiconductor elements 416a, 416b include, but are not limited to, $Bi_2Te_3$, $Pb_{03}Ge_{39}Se_{58}$, and $Pb_{06}Ge_{36}Se_{58}$. Again, unlike conventional thermoelectric devices, the thermal conductivity of the semiconductor material is not critical to the efficiency of thermoelectric device 410. Thus, p-type semiconductor elements 416a, 416b may be formed of a material in which the thermal conductivity is greater than about 0.10 W/cm ° K, e.g., 0.10, 0.12, 0.14, 0.16, 0.18, 0.20, 0.22, 0.24 or greater W/cm ° K.

As described in detail below, the dimensions of n-type semiconductor elements 414a, 414b and p-type semiconductor elements 416a, 416b can be altered to maximize the efficiency of thermoelectric device 410. In this embodiment, the dimensions of n-type semiconductor elements 414a, 414b are substantially identical to the dimensions of p-type semiconductor elements 416a, 416b. In an alternative embodiment, the dimensions of n-type semiconductor elements 414a, 414b are different than the dimensions of p-type semiconductor elements 416a, 416b. In a preferred embodiment, the thickness of n-type semiconductor elements 414a, 414b and p-type semiconductor elements 416a, 416b is about 2.0 mm or less, e.g., 2.0, 1.9, 1.8, 1.7, 1.6, 1.5, 1.4, 1.3, 1.2, 1.1, 1.0. 0.9, 0.8 or less mm.

The distance between each n-type element assembly 414 and corresponding p-type element assembly 416 is shown in FIG. 15 as d1. The distance between adjacent thermoelectric couples (e.g., the distance between thermoelectric couple 412a and thermoelectric couple 412b) is shown in FIG. 15 as d2. In this embodiment, the value of d1 is substantially the same as the value of d2. Unlike conventional thermoelectric devices, there is no limit on the values of d1 and d2 (i.e., the value of d1 and d2 in FIG. 15 can be greater than the value of d in FIG. 14). Increasing the value of d1 and d2 improves the efficiency of thermoelectric device 410 and, in addition, reduces the cost of manufacturing because fewer element assemblies are required for the device. Of course, it should be understood that the use of fewer element assemblies also reduces the overall power generated per area. As such, if too few element assemblies are used, there would not be enough power to justify the cost of the materials. Thus, there is a balance between the number of element assemblies that are used, the efficiency, the cost of the materials, and the overall power output. Preferably, the value of d1 and d2 is chosen so as to provide the greatest efficiency in relation to the desired power output for thermoelectric device 410. In a preferred embodiment, the value of d1 and d2 is between about 0.05 cm and about 3.0 cm.

In certain applications, it may be desirable to use multiple modules connected in series or in parallel in order to achieve a desired amount of total power output, or, to use any combination of modules in series and parallel. One skilled in the art will understand that when a module is connected in series with another module, the voltage increases while the current remains the same. When a module is connected in parallel with another module, the current increases while the voltage remains the same. Because power is equal to voltage times current, the power increases by the same amount no matter how the modules are connected. Thus, the use of modules connected in series and/or in parallel provides a way to set the voltage and current at desired levels.

N-type semiconductor elements 414a, 414b and p-type semiconductor elements 416a, 416b are electrically connected in series via electrical conductors 414c, 416c and connections 414d, 414e, 416d, 416e, respectively, and connection plates 418a, 418b, 418c, 418d and 418e. In one embodiment, electrical conductors 414c, 416c, connections 414d, 414e, 416d, 416e, and connection plates 418a, 418b, 418c, 418d and 418e are made from the same material. In another embodiment, electrical conductors 414c, 416c, connections 414d, 414e, 416d, 416e, and connection plates 418a, 418b, 418c, 418d and 418e are made from different materials. Examples of suitable materials for electrical conductors 414c, 416c, connections 414d, 414e, 416d, 416e, and connection plates 418a, 418b, 418c, 418d and 418e include, but are not limited to, nickel, aluminum, copper, silver, zinc, and high temperature solder.

Electrical conductors 414c, 416c and connections 414d, 414e and 416d, 416e are preferably made of a material having a low thermal conductivity and a high electrical conductivity. The material is preferably chosen so as to maximize the ratio of electrical conductivity to thermal conductivity. In a preferred embodiment, the ratio of electrical conductivity to thermal conductivity is in a range of about $1.3 \times 10^5$ S°K/W to about $1.6 \times 10^5$ S°K/W and greater. Preferably, electrical conductor 414c and connections 414d, 414e are made from an electrically conductive material with a negative Seebeck coefficient (e.g., nickel) and electrical conductor 416c and connections 416d, 416e are made from an electrically conductive material with a positive Seebeck coefficient (e.g., copper). High temperature solder could also be used for connections 414d, 414e and 416d, 416e so as to reduce the cost of manufacturing.

Connection plates 418a, 418b, 418c, 418d and 418e are preferably made of a material having a high thermal conductivity and a high electrical conductivity (e.g., silver, copper or aluminum). Of course, one skilled in the art will understand that the materials may be chosen in view of cost considerations, e.g., while silver has a high thermal conductivity, it may be sufficient to use copper or aluminum in view of their lower costs.

The length and diameter of electrical conductors 414c, 416c affect the efficiency of thermoelectric device 410 and the amount of current that can safely travel through device 410. In general, it is desired to maximize the length of electrical conductors 414c, 416c (and thus increase the thermal distance between top plate 420 and bottom plate 422) and minimize the diameter of electrical conductors 414c, 416c so as to lower the amount of heat transferred between top plate 420 and bottom plate 422. This results in a larger temperature difference between top plate 420 and bottom plate 422 to thereby increase the efficiency of thermoelectric device 410. In cases where the current levels are too high, the current may be reduced to acceptable levels by adjusting the length of electrical conductors 414c, 416c, adjusting the size of the semiconductor elements 414a, 414b, 416a, 416b, and/or adjusting the distance between element assemblies 414, 416. It is also possible to change the gauge of electrical conductors 414c, 416c so as to enable higher current levels, but this approach is not preferred insofar as a larger diameter gauge will reduce the efficiency of thermoelectric device 410.

In a preferred embodiment, electrical conductors 414c, 416c have a length in a range from about 2 cm to about 8 cm or greater. Also, in a preferred embodiment, electrical conductors 414c, 416c have a diameter in a range from about 0.51054 mm (24 AWG) to about 3.66522 mm (7 AWG). In this embodiment, electrical conductors 414c, 416c are substantially identical so as to have substantially the same length and diameter. In an alternative embodiment, electrical conductor 414c has a different length and/or diameter compared to those of electrical conductor 416c. One skilled in the art will understand that if the dimensions of n-type semiconductor elements 414a, 414b and p-type semiconductor elements 416a, 416b are different, then electrical conductors 414c, 416c may have different lengths such that the overall thermal distance between top plate 420 and bottom plate 422 for each element assembly 414, 416 is substantially the same.

In this embodiment, top plate 420 and bottom plate 422 are made from a material having a high thermal conductivity and a low electrical conductivity. One suitable material for top and bottom plates 420, 422 is Ceramacast™ 675N (ceramic doped with aluminum nitride) available from Aremco Products Inc., which can be used at higher temperatures up to 2200° F. Another suitable material is CoolPoly® D5108 (polyphenylene sulfide (PPS)) available from Cool Polymers, Inc. It is also possible to mix a filler, such as boron nitride, aluminum oxide, or aluminum nitride, with either of these materials. Of course, other materials may also be used.

It should be understood that top plate 420 is positioned so as to be in contact with one of the rotor housings (e.g., rotor housings 18, 20 and 22) and bottom plate 422 is positioned so as to be in contact with one of the heat sinks (e.g., heat sinks 142, 146, 152 and 158). In operation, the rotor housing provides heat to top plate 420 and the heat sink cools bottom plate 422, which results in a temperature difference (ΔT) between top plate 420 and bottom plate 422. This temperature difference excites the atoms in the semiconductor elements so that the atoms begin to move, which causes an electrical current to flow in thermoelectric device 410. This current is delivered to a load 440 through connection points 424, 426. Load 440 may comprise any type of load that is operable to receive, use and/or store power generated by thermoelectric device 410.

A thermoelectric device is not perfectly efficient and energy is lost to the ambient air and to heat generated within the device. In general terms, the efficiency of a thermoelectric device is measured by the ratio of the energy provided to a load to the heat energy absorbed by the top plate. A thermoelectric device with higher efficiency will generate more power for the load. The efficiency of a thermoelectric device may be expressed by the following equation (wherein it is assumed that the plate receiving the heat input is the top plate):

$$\eta = \frac{\Delta T}{2T_h - \frac{\Delta T}{2} + \frac{4}{Z}} \quad (1)$$

where
η=efficiency of thermoelectric device;
ΔT=temperature difference between top plate and bottom plate in degrees Kelvin (° K);
$T_h$=temperature of top plate in degrees Kelvin (° K); and
Z=figure of merit for thermoelectric device in 1/° K.

The figure of merit for a thermoelectric device is determined by the materials used to construct each of the thermoelectric couples of the device, as set forth in the following equation:

$$Z = \frac{S_{eq}^2}{R_{eq} \cdot K_{eq}} \quad (2)$$

where
Z=figure of merit for thermoelectric device in 1/° K;
$S_{eq}$=equivalent Seebeck coefficient for single thermoelectric couple in μV/° K;
$R_{eq}$=equivalent electrical resistance for single thermoelectric couple in ohms; and
$K_{eq}$=equivalent thermal conductance for single thermoelectric couple in W/° K.

The equivalent electrical resistance and equivalent thermal conductance are dependent on the electrical resistance and thermal conductance, respectfully, for the n-type and p-type semiconductor elements in a single thermoelectric couple. The equivalent electrical resistance represents how difficult it is for current to flow through the thermoelectric device. The equivalent thermal conductance represents how easily heat flows through the thermoelectric device. It will be seen that the equivalent electrical resistance and equivalent thermal conductance are calculated differently depending on the configuration of the thermoelectric device.

The electrical resistance for a p-type semiconductor element is dependent on the electrical resistivity of the material used to construct the element and the dimensions of the element, as shown by the following equation:

$$R_p = \rho_p \cdot \left(\frac{h_p}{SA_p}\right) \quad (3)$$

where $R_p$=electrical resistance for p-type semiconductor element in ohms;

$\rho_p$=electrical resistivity of material used for p-type semiconductor element in ohms·cm;

$h_p$=height of p-type semiconductor element in cm; and $SA_p$=cross-sectional surface area of p-type semiconductor element in cm².

Similarly, the electrical resistance for an n-type semiconductor element is dependent on the electrical resistivity of the material used to construct the element and the dimensions of the element, as shown by the following equation:

$$R_n = \rho_n \cdot \left(\frac{h_n}{SA_n}\right) \quad (4)$$

where $R_n$=electrical resistance for n-type semiconductor element in ohms;

$\rho_n$=electrical resistivity of material used for n-type semiconductor element in ohms·cm;

$h_n$=height of n-type semiconductor element in cm; and $SA_n$=cross-sectional surface area of n-type semiconductor element in cm².

The thermal conductance for a p-type semiconductor element is dependent on the thermal conductivity of the material used to construct the element and the dimensions of the element, as shown by the following equation:

$$K_p = k_p \cdot \left(\frac{SA_p}{h_p}\right) \quad (5)$$

where $K_p$=thermal conductance for p-type semiconductor element in W/° K;

$k_p$=thermal conductivity of material used for p-type semiconductor element in W/cm·° K;

$SA_p$=cross-sectional surface area of p-type semiconductor element in cm²; and $h_p$=height of p-type semiconductor element in cm.

Similarly, the thermal conductance for an n-type semiconductor element is dependent on the thermal conductivity of the material used to construct the element and the dimensions of the element, as shown by the following equation:

$$K_n = k_n \cdot \left(\frac{SA_n}{h_n}\right) \quad (6)$$

where $K_n$=thermal conductance for n-type semiconductor element in W/° K;

$k_n$=thermal conductivity of material used for n-type semiconductor element in W/cm·° K;

$SA_n$=cross-sectional surface area of n-type semiconductor element in cm²; and $h_n$=height of n-type semiconductor element in cm.

As can be seen from equation (1) above, the efficiency of a thermoelectric device can be increased by increasing the temperature difference between the top plate and the bottom plate and/or increasing the figure of merit for the thermoelectric device. As can be seen from equation (2) above, the figure of merit for the thermoelectric device can be increased (to thereby increase the efficiency) by increasing the equivalent Seebeck coefficient for a single thermoelectric couple, decreasing the equivalent electrical resistance for a single thermoelectric couple, and/or decreasing the equivalent thermal conductance for a single thermoelectric couple.

From these equations, it will be seen that the efficiency of thermoelectric device 410 can be increased in one or more different ways, including: using semiconductor materials with higher Seebeck coefficients that are not suitable for use with conventional thermoelectric device 310 (described in greater detail below); increasing the distance between element assemblies in thermoelectric device 410 (described above); and/or increasing the length of the electrical conductors connecting the semiconductor elements and thereby increasing the thermal distance between the top and bottom plates (described above).

As mentioned above, the configuration of thermoelectric device 410 shown in FIG. 15 enables the use of semiconductor materials with higher Seebeck coefficients that are not suitable for use with conventional thermoelectric device 310 shown in FIG. 14. These semiconductor materials increase the figure of merit to thereby increase the efficiency of thermoelectric device 410. To illustrate this aspect, an example is provided below that compares the efficiency of conventional thermoelectric device 310 to the efficiency of thermoelectric device 410.

Conventional Thermoelectric Device 310

As discussed above, conventional thermoelectric device 310 is comprised of n-type semiconductor elements 314 and p-type semiconductor elements 316. For purposes of this example, we will assume that n-type semiconductor elements 314 are made of $Bi_2Te_3$+0.1% I and p-type semiconductor elements 316 are made of $Bi_2Te_3$. We will also assume that semiconductor elements 314, 316 each have a length of 1 cm, a width of 1 cm, and a height of 0.05 cm. Table 1 is provided below to show the various properties for these semiconductor materials, namely, the Seebeck coefficient (S), the thermal conductivity (k), and the electrical resistivity (p) for each semiconductor material. These values will be used below to perform various calculations relating to the efficiency of thermoelectric device 310.

TABLE 1

| | n-type semiconductor element ($Bi_2Te_3$ + 0.1% I) | p-type semiconductor element ($Bi_2Te_3$) |
|---|---|---|
| Seebeck coefficient (S) | $-184 \times 10^{-6}$ V/° K | $240 \times 10^{-6}$ V/° K |
| thermal conductivity (k) | 0.0256 W/(cm · ° K) | 0.02 W/(cm · ° K) |
| electrical resistivity (ρ) | $0.63 \times 10^{-3}$ ohms · cm | $0.52 \times 10^{-3}$ ohms · cm |

To calculate the efficiency of thermoelectric device 310 using equation (1) above, we must first calculate the figure of merit for thermoelectric device 310 using equation (2) above. This requires calculation of the equivalent Seebeck coefficient ($S_{eq}$), the equivalent electrical resistance ($R_{eq}$), and the equivalent thermal conductance ($K_{eq}$) for a single thermoelectric couple of thermoelectric device 310.

The equivalent Seebeck coefficient for a single thermoelectric couple of thermoelectric device 310 is the difference between the Seebeck coefficient for the p-type semiconductor material and the Seebeck coefficient for the n-type semiconductor material, as shown by the following equation:

$$S_{eq} = S_p - S_n \quad (7)$$

where $S_{eq}$=equivalent Seebeck coefficient for single thermoelectric couple in µV/° K;

$S_p$=Seebeck coefficient for p-type semiconductor material in µV/° K; and $S_n$=Seebeck coefficient for n-type semiconductor material in µV/° K.

Thus, the equivalent Seebeck coefficient for a single thermoelectric couple of thermoelectric device 310 is calculated from equation (7) using the values for the Seebeck coefficient for the p-type semiconductor element ($S_p$) and the Seebeck coefficient for the n-type semiconductor element ($S_n$) shown in Table 1, as follows:

$$S_{eq} = S_p - S_n = 240 \times 10^{-6} - (-184 \times 10^{-6}) = 424 \text{ µV/° K}$$

Next, because n-type semiconductor element 314 and p-type semiconductor element 316 and are electrically connected in series, the equivalent electrical resistance for a single thermoelectric couple of thermoelectric device 310 is the sum of the electrical resistance for p-type semiconductor element 316 and the electrical resistance for n-type semiconductor element 314, as shown by the following equation:

$$R_{eq} = R_p + R_n \quad (8)$$

where $R_{eq}$=equivalent electrical resistance for single thermoelectric couple in ohms;

$R_p$=electrical resistance for p-type semiconductor element in ohms; and $R_n$=electrical resistance for n-type semiconductor element in ohms.

The electrical resistance for p-type semiconductor element 316 ($R_p$) is calculated using equation (3) above (using the value for p-type electrical resistivity ($\rho_p$) shown in Table 1 above and the dimensions of p-type semiconductor element 316 set forth above), as follows:

$$R_p = \rho_p \cdot \left(\frac{h_p}{SA_p}\right) = 0.52 \times 10^{-3} \cdot \left(\frac{0.05}{1}\right) = 2.60 \times 10^{-5} \Omega$$

The electrical resistance for n-type semiconductor element 314 ($R_n$) is calculated using equation (4) above (using the value for n-type electrical resistivity ($\rho_n$) shown in Table 1 above and the dimensions of n-type semiconductor element 316 set forth above), as follows:

$$R_n = \rho_n \cdot \left(\frac{h_n}{SA_n}\right) = 0.63 \times 10^{-3} \cdot \left(\frac{0.05}{1}\right) = 3.15 \times 10^{-5} \Omega$$

Thus, the equivalent electrical resistance ($R_{eq}$) for a single thermoelectric couple of thermoelectric device 310 is calculated using equation (8) above, as follows:

$$R_{eq} = R_p + R_n = 2.6 \times 10^{-5} + 3.15 \times 10^{-5} = 5.75 \times 10^{-5} \Omega$$

Next, because p-type semiconductor element 316 and n-type semiconductor element 314 are thermally connected in parallel, the equivalent thermal conductance for a single thermoelectric couple of thermoelectric device 310 is the sum of the thermal conductance for p-type semiconductor element 316 and the thermal conductance for n-type semiconductor element 314, as shown by the following equation:

$$K_{eq} = K_p + K_n \quad (9)$$

where $K_{eq}$=the equivalent thermal conductance for a single thermoelectric couple in W/° K;

$K_p$=the thermal conductance for the p-type semiconductor element in W/° K; and $K_p$=the thermal conductance for the n-type semiconductor element in W/° K.

The thermal conductance for p-type semiconductor element 316 ($K_p$) is calculated using equation (5) above (using the value for p-type thermal conductivity ($k_p$) shown in Table 1 above and the dimensions of p-type semiconductor element 316 set forth above), as follows:

$$K_p = k_p \cdot \left(\frac{SA_p}{h_p}\right) = 0.02 \cdot \left(\frac{1}{0.05}\right) = 0.40 W/°K$$

The thermal conductance for n-type semiconductor element 314 ($K_n$) is calculated using equation (6) above (using the value for n-type thermal conductivity ($k_n$) shown in Table 1 above and the dimensions of n-type semiconductor element 314 set forth above), as follows:

$$K_n = k_n \cdot \left(\frac{SA_n}{h_n}\right) = 0.26 \cdot \left(\frac{1}{0.05}\right) = 0.512 W/°K$$

Thus, the equivalent thermal conductance ($K_{eq}$) for a single thermoelectric couple of thermoelectric device 310 is calculated using equation (9) above, as follows:

$$K_{eq} = K_p + K_n = 0.4 + 0.512 = 0.912 \text{ W/° K}$$

As a result, the figure of merit for thermoelectric device 310 is calculated using equation (2) above, as follows:

$$Z = \frac{S_{eq}^2}{R_{eq} \cdot K_{eq}} = \frac{(424 \times 10^{-6})^2}{(5.75 \times 10^{-5}) \cdot (0.912)} = 3.43 \times 10^{-3} 1/°K$$

For purposes of comparison, we will calculate the efficiency of thermoelectric device 310 at three different temperatures for top plate 320 (i.e., the "hot" plate in contact with the rotor housing): 473° K, 573° K and 673° K. For each of these temperatures, we will assume a temperature of 273° K on bottom plate 322 (i.e., the "cold" plate in contact with the heat sink).

Assuming a temperature of 473° K on top plate 320 ($T_h$=473° K) and a temperature of 273° K on bottom plate 322 ($T_c$=273° K), the temperature difference between the plates is calculated as follows:

$$\Delta T = T_h - T_c = 473 - 273 = 200° \text{ K}$$

The efficiency of thermoelectric device 310 can be calculated using equation (1) above, as follows:

$$\eta = \frac{\Delta T}{2T_h - \frac{\Delta T}{2} + \frac{4}{Z}} = \frac{200}{2 \cdot (473) - \frac{200}{2} + \frac{4}{3.43 \times 10^{-3}}} = 0.0994 = 9.94\%$$

Thus, thermoelectric device 310 has an efficiency of 9.94% in the example where the device uses the semiconductor materials shown in Table 1 above and there is a temperature difference of 200° K between top plate 320 and bottom plate 322. In other words, thermoelectric device 310 is only utilizing 9.94% of the energy absorbed by top plate 320.

Assuming a temperature of 573° K on top plate 320 ($T_h$=573° K) and a temperature of 273° K on bottom plate 322 (T=273° K), the temperature difference between the plates is calculated as follows:

$$\Delta T = T_h - T_c = 573 - 273 = 300° \text{ K}$$

The efficiency of thermoelectric device 310 can be calculated using equation (1) above, as follows:

$$\eta = \frac{\Delta T}{2T_h - \frac{\Delta T}{2} + \frac{4}{Z}} = \frac{300}{2 \cdot (573) - \frac{300}{2} + \frac{4}{3.43 \times 10^{-3}}} = 0.139 = 13.9\%$$

Thus, thermoelectric device 310 has an efficiency of 13.9% in the example where the device uses the semiconductor materials shown in Table 1 above and there is a temperature difference of 300° K between top plate 320 and bottom plate 322. In other words, thermoelectric device 310 is only utilizing 13.9% of the energy absorbed by top plate 320.

Assuming a temperature of 673° K on top plate 320 ($T_h$=673° K) and a temperature of 273° K on bottom plate 322 ($T_c$=273° K), the temperature difference between the plates is calculated as follows:

$$\Delta T = T_h - T_c = 673 - 273 = 400° \text{ K}$$

The efficiency of thermoelectric device 310 can be calculated using equation (1) above, as follows:

$$\eta = \frac{\Delta T}{2T_h - \frac{\Delta T}{2} + \frac{4}{Z}} = \frac{400}{2 \cdot (673) - \frac{400}{2} + \frac{4}{3.43 \times 10^{-3}}} = 0.173 = 17.3\%$$

Thus, thermoelectric device 310 has an efficiency of 17.3% in the example where the device uses the semiconductor materials shown in Table 1 above and there is a temperature difference of 400° K between top plate 320 and bottom plate 322. In other words, thermoelectric device 310 is only utilizing 17.3% of the energy absorbed by top plate 320.

Of course, one skilled in the art will understand that the efficiency of thermoelectric device 310 may be calculated for any combination of values for the temperatures of top and bottom plates 320, 322.

Preferred Thermoelectric Device 410

As discussed above, thermoelectric device 410 of the preferred embodiment is comprised of n-type semiconductor elements 414a, 414b connected by electrical conductor 414c and p-type semiconductor elements 416a, 416b connected by electrical conductor 416c. For purposes of this example, we will assume that n-type semiconductor elements 414a, 414b are made of $Bi_2S_3$ (sintered), p-type semiconductor elements 416a, 416b are made of $Bi_2Te_3$ (i.e. the same material as p-type semiconductor elements 316 of thermoelectric device 310), and electrical conductors 414c, 416c are made of 23 AWG copper wire. We will also assume that semiconductor elements 414a, 414b, 416a, 416b each have a length of 1 cm, a width of 1 cm, and a height of 0.05 cm (i.e., the same dimensions as semiconductor elements 314, 316 of thermoelectric device 310), and that electrical conductors 414c, 416c each have a length of 2.54 cm. Table 2 is provided below to show the various properties for these semiconductor materials and electrical conductors, namely, the Seebeck coefficient (S), the thermal conductivity (k), and the electrical resistivity ($\rho$) for each material. These values will be used below to perform various calculations relating to the efficiency of thermoelectric device 410.

TABLE 2

|  | n-type semiconductor element ($Bi_2Te_3$ + 0.1% I) | p-type semiconductor element ($Bi_2Te_3$) | electrical conductor (Cu) |
|---|---|---|---|
| Seebeck coefficient (S) | $-1300 \times 10^{-6}$ V/° K | $240 \times 10^{-6}$ V/° K | n/a |
| thermal conductivity (k) | 0.206 W/(cm · ° K) | 0.02 W/(cm · ° K) | 4.01 W/(cm · ° K) |
| electrical resistivity ($\rho$) | $1.0 \times 10^{-3}$ ohms · cm | $0.52 \times 10^{-3}$ ohms · cm | $16.78 \times 10^{-7}$ ohms · cm |

To calculate the efficiency of thermoelectric device 410 using equation (1) above, we must first calculate the figure of merit for thermoelectric device 410 using equation (2) above. This requires calculation of the equivalent Seebeck coefficient ($S_{eq}$), the equivalent electrical resistance ($R_{eq}$), and the equivalent thermal conductance ($K_{eq}$) for a single thermoelectric couple of thermoelectric device 410.

Like thermoelectric device 310, the equivalent Seebeck coefficient for a single couple of thermoelectric device 410 is the difference between the Seebeck coefficient for the p-type semiconductor material and the Seebeck coefficient for the n-type semiconductor material, as shown by equation (7) above. Thus, the equivalent Seebeck coefficient for a single thermoelectric couple of thermoelectric device 410 is calculated from equation (7) using the values for the Seebeck coefficient for the p-type semiconductor element ($S_p$) and the Seebeck coefficient for the n-type semiconductor element ($S_n$) shown in Table 2, as follows:

$$S_{eq} = S_p - S_n = 240 \times 10^{-6} - (-1300 \times 10^{-6}) = 1540 \times 10^{-6} \text{ V/° K}$$

Next, because n-type semiconductor elements 414a, 414b, p-type semiconductor elements 416a, 416b, and electrical conductors 414c, 416c are electrically connected in series, the equivalent electrical resistance for a single thermoelectric couple of thermoelectric device 410 is the sum of the electrical resistances for each of n-type semiconductor elements 414a, 414b, p-type semiconductor elements 416a, 416b, and electrical conductors 414c, 416c, as shown by the following equation:

$$R_{eq} = 2R_n + 2R_p + 2R_c \quad (10)$$

where $R_{eq}$=equivalent electrical resistance for single thermoelectric couple in ohms;

$R_p$=electrical resistance for each p-type semiconductor element in ohms;

$R_n$=electrical resistance for each n-type semiconductor element in ohms; and $R_c$=electrical resistance for each electrical conductor in ohms.

The electrical resistance for each of p-type semiconductor elements 416a, 416b ($R_p$) is calculated using equation (3) above (using the value for p-type electrical resistivity ($\rho_p$) shown in Table 2 above and the dimensions of each of p-type semiconductor elements 416a, 416b set forth above), as follows:

$$R_p = \rho_p \cdot \left(\frac{h_p}{SA_p}\right) = 0.52 \times 10^{-3} \cdot \left(\frac{0.05}{1}\right) = 2.60 \times 10^{-5} \Omega$$

The electrical resistance for each of n-type semiconductor elements 414a, 414b ($R_n$) is calculated using equation (4) above (using the value for n-type electrical resistivity ($\rho_n$) shown in Table 2 above and the dimensions of each of n-type semiconductor elements 414a, 414b set forth above), as follows:

$$R_n = \rho_n \cdot \left(\frac{h_n}{SA_n}\right) = 1.00 \times 10^{-3} \cdot \left(\frac{0.05}{1}\right) = 5.00 \times 10^{-5} \Omega$$

The electrical resistance for each of electrical conductors 414c, 416c is dependent on the electrical resistivity of the material used to construct each conductor and the dimensions of each conductor, as shown by the following equation:

$$R_c = \rho_c \cdot \left(\frac{h_c}{SA_c}\right) \quad (11)$$

where $R_c$=electrical resistance for each electrical conductor in ohms;

$\rho_c$=electrical resistivity of material used for each electrical conductor in ohms·cm;

$h_c$=length of each electrical conductor in cm; and $SA_c$=cross-sectional surface area of each electrical conductor in cm².

The electrical resistance for each of electrical conductors 414c, 416c is calculated using equation (11) above (using the value for electrical resistivity ($\rho_c$) shown in Table 2 above and the dimensions of each of electrical conductors 414c, 416c set forth above, wherein the surface area of 23 AWG copper wire is known to be $2.60 \times 10^{-3}$ cm²), as follows:

$$R_c = \rho_c \cdot \left(\frac{h_c}{SA_c}\right) = 16.78 \times 10^{-7} \cdot \left(\frac{2.54}{2.60 \times 10^{-3}}\right) = 1.64 \times 10^{-3} \Omega$$

Thus, the equivalent electrical resistance ($R_{eq}$) for a single thermoelectric couple of thermoelectric device 410 is calculated using equation (10) above, as follows:

$$R_{eq} = 2R_n + 2R_p + 2R_c = 2 \cdot (5.00 \times 10^{-5}) + 2 \cdot (2.60 \times 10^{-5}) + 2 \cdot (1.64 \times 10^{-3}) = 3.43 \times 10^{-3} \Omega$$

Next, because p-type element assembly 416 and n-type element assembly 414 are thermally connected in parallel, the equivalent thermal conductance for a single thermoelectric couple of thermoelectric device 410 is the sum of the equivalent thermal conductance for p-type element assembly 416 and the equivalent thermal conductance for n-type element assembly 414, as shown by the following equation:

$$K_{eq} = K_{peq} + K_{neq} \quad (12)$$

where $K_{eq}$=equivalent thermal conductance for single thermoelectric couple in W/° K;

$K_{peq}$=equivalent thermal conductance for p-type element assembly in W/° K; and $K_{neq}$=equivalent thermal conductance for n-type element assembly in W/° K.

Because p-type semiconductor elements 416a, 416b and electrical conductor 416c are thermally connected in series, the equivalent thermal conductance for p-type element assembly 416 can be calculated from the equation below:

$$K_{peq} = \frac{K_p K_c}{K_p + 2K_c} \quad (13)$$

where $K_{peq}$=equivalent thermal conductance for p-type element assembly in W/° K;

$K_p$=thermal conductance for each p-type semiconductor element in W/° K; and $K_c$=thermal conductance for electrical conductor in W/° K.

The thermal conductance for each of p-type semiconductor elements 416a, 416b ($K_p$) is calculated using equation (5) above (using the value for p-type thermal conductivity ($k_p$) shown in Table 2 above and the dimensions of each of p-type semiconductor elements 416a, 416b set forth above), as follows:

$$K_p = k_p \cdot \left(\frac{SA_p}{h_p}\right) = 0.02 \cdot \left(\frac{1}{0.05}\right) = 0.40 \, W/°K$$

The thermal conductance for an electrical conductor is dependent on the thermal conductivity of the material used to construct the conductor and the dimensions of the conductor, as shown by the following equation:

$$K_c = k_c \cdot \left(\frac{SA_c}{h_c}\right) \quad (14)$$

where $K_c$=thermal conductance for electrical conductor in W/° K;

$k_c$=thermal conductivity of material used for electrical conductor in W/cm·° K;

$SA_c$=cross-sectional surface area of electrical conductor in cm²; and $h_c$=length of electrical conductor in cm.

The thermal conductance for electrical conductor 416c ($K_c$) is calculated using equation (14) above (using the value for thermal conductivity ($k_c$) shown in Table 2 above and the dimensions of electrical conductor 416c set forth above, wherein the surface area of 23 AWG copper wire is known to be $2.60 \times 10^{-3}$ cm$^2$), as follows:

$$K_c = k_c \cdot \left(\frac{SA_c}{h_c}\right) = 4.01 \cdot \left(\frac{2.60 \times 10^{-3}}{2.54}\right) = 4.11 \times 10^{-3} W/°K$$

Thus, the equivalent thermal conductance for p-type element assembly 416 ($K_{peq}$) is calculated using equation (13) above, as follows:

$$K_{peq} = \frac{K_p K_c}{K_p + 2K_c} = \frac{(0.40) \cdot 4.11 \times 10^{-3}}{(0.40) + 2 \cdot (4.11 \times 10^{-3})} = 4.02 \times 10^{-3} W/°K$$

Similarly, because n-type semiconductor elements 414a, 414b and electrical conductor 414c are thermally connected in series, the equivalent thermal conductance for n-type element assembly 414 can be calculated from the equation below:

$$K_{neq} = \frac{K_n K_c}{K_n + 2K_c} \quad (15)$$

where $K_{neq}$=equivalent thermal conductance for n-type element assembly in W/° K;

$K_n$=thermal conductance for each n-type semiconductor element in W/° K; and $K_c$=thermal conductance for electrical conductor in W/° K.

The thermal conductance for each of n-type semiconductor elements 414a, 414b ($K_n$) is calculated using equation (6) above (using the value for n-type thermal conductivity ($k_n$) shown in Table 2 above and the dimensions of each of n-type semiconductor elements 414a, 414b set forth above), as follows:

$$K_n = k_n \cdot \left(\frac{SA_n}{h_n}\right) = 0.206 \cdot \left(\frac{1}{0.05}\right) = 4.12 W/°K$$

The thermal conductance for electrical conductor 414c ($K_c$) is calculated using equation (14) above (using the value for thermal conductivity ($k_c$) shown in Table 2 above and the dimensions of electrical conductor 414c set forth above, wherein the surface area of 23 AWG copper wire is known to be $2.60 \times 10^{-3}$ cm$^2$), as follows:

$$K_c = k_c \cdot \left(\frac{SA_c}{h_c}\right) = 4.01 \cdot \left(\frac{2.60 \times 10^{-3}}{2.54}\right) = 4.11 \times 10^{-3} W/°K$$

Thus, the equivalent thermal conductance for n-type element assembly 414 ($K_{neq}$) is calculated using equation (13) above, as follows:

$$K_{neq} = \frac{K_n K_c}{K_n + 2K_c} = \frac{(4.12) \cdot 4.11 \times 10^{-3}}{(4.12) + 2 \cdot (4.11 \times 10^{-3})} = 4.10 \times 10^{-3} W/°K$$

The equivalent thermal conductance for a single thermoelectric couple of thermoelectric device 410 ($K_{eq}$) is then calculated using equation (12) above, as follows:

$$K_{eq} = K_{peq} + K_{neq} = 4.02 \times 10^{-3} + 4.10 \times 10^{-3} = 8.12 \times 10^{-3} W/°K$$

As a result, the figure of merit for thermoelectric device 410 is calculated using equation (2) above, as follows:

$$Z = \frac{S_{eq}^2}{R_{eq} \cdot K_{eq}} = \frac{(1540 \times 10^{-6})^2}{(3.43 \times 10^{-3}) \cdot (8.12 \times 10^{-3})} = 85.2 \times 10^{-3} 1/°K$$

For purposes of comparison, we will calculate the efficiency of thermoelectric device 410 at three different temperatures for top plate 420 (i.e., the "hot" plate in contact with the rotor housing): 473° K, 573° K and 673° K. For each of these temperatures, we will assume a temperature of 273° K on bottom plate 422 (i.e., the "cold" plate in contact with the heat sink). It should be noted that these same temperatures were used in the calculations for conventional thermoelectric device 310 above.

Assuming a temperature of 473° K on top plate 420 ($T_h$=573° K) and a temperature of 273° K on bottom plate 422 ($T_c$=273° K), the temperature difference between the plates is calculated as follows:

$$\Delta T = T_h - T_c = 473 - 273 = 200° K$$

The efficiency of thermoelectric device 410 can be calculated using equation (1) above, as follows:

$$\eta = \frac{\Delta T}{2T_h - \frac{\Delta T}{2} + \frac{4}{Z}} = \frac{200}{2 \cdot (473) - \frac{200}{2} + \frac{4}{85.2 \times 10^{-3}}} = 0.224 = 22.4\%$$

Thus, thermoelectric device 410 has an efficiency of 22.4% in the example where the device uses the semiconductor materials shown in Table 2 above and there is a temperature difference of 200° K between top plate 420 and bottom plate 422. In other words, thermoelectric device 410 is utilizing 22.4% of the energy absorbed by top plate 420.

Assuming a temperature of 573° K on top plate 420 ($T_h$=573° K) and a temperature of 273° K on bottom plate 422 ($T_c$=273° K), the temperature difference between the plates is calculated as follows:

$$\Delta T = T_h - T_c = 573 - 273 = 300° K$$

The efficiency of thermoelectric device 410 can be calculated using equation (1) above, as follows:

$$\eta = \frac{\Delta T}{2T_h - \frac{\Delta T}{2} + \frac{4}{Z}} = \frac{300}{2 \cdot (573) - \frac{300}{2} + \frac{4}{85.2 \times 10^{-3}}} = 0.288 = 28.8\%$$

Thus, thermoelectric device 410 has an efficiency of 28.8% in the example where the device uses the semiconductor materials shown in Table 2 above and there is a temperature difference of 300° K between top plate 420 and bottom plate 422. In other words, thermoelectric device 410 is utilizing 28.8% of the energy absorbed by top plate 420.

Assuming a temperature of 673° K on top plate 420 ($T_h$=573° K) and a temperature of 273° K on bottom plate 422 ($T_c$=273° K), the temperature difference between the plates is calculated as follows:

$$\Delta T = T_h - T_c = 673 - 273 = 400° K$$

The efficiency of thermoelectric device 410 can be calculated using equation (1) above, as follows:

$$\eta = \frac{\Delta T}{2T_h - \frac{\Delta T}{2} + \frac{4}{Z}} = \frac{400}{2 \cdot (673) - \frac{400}{2} + \frac{4}{85.2 \times 10^{-3}}} = 0.335 = 33.5\%$$

Thus, thermoelectric device 410 has an efficiency of 33.5% in the example where the device uses the semiconductor materials shown in Table 2 above and there is a temperature difference of 400° K between top plate 420 and bottom plate 422. In other words, thermoelectric device 410 is utilizing 33.5% of the energy absorbed by top plate 420.

Of course, one skilled in the art will understand that the efficiency of thermoelectric device 410 may be calculated for any combination of values for the temperatures of top and bottom plates 420, 422.

Table 3 is provided below to show a side-by-side comparison of the figure of merit and efficiencies calculated above for conventional thermoelectric device 310 and the preferred embodiment of thermoelectric device 410.

TABLE 3

|  | Thermoelectric Device 310 | Thermoelectric Device 410 |
|---|---|---|
| Figure of Merit (Z) | 3.43 × 10⁻³ | 85.2 × 10⁻³ |
| Efficiency at ΔT = 200° K | 9.94% | 22.4% |
| Efficiency at ΔT = 300° K | 13.9% | 28.8% |
| Efficiency at ΔT = 400° K | 17.3% | 33.5% |

As can be seen from Table 3, thermoelectric device 410 has a figure of merit that is almost 25 times greater than that of conventional thermoelectric device 310. This dramatic increase in the figure of merit is primarily a result of the use of a semiconductor material for n-type semiconductor elements 414a, 414b ($Bi_2S_3$(sintered)) having a Seebeck coefficient with a negative value that is much larger than that of the semiconductor material used for n-type semiconductor element 314 ($Bi_2Te_3$+0.1% I). It should also be noted that, in this example, even though n-type semiconductor elements 414a, 414b have a significantly larger thermal conductance than that of semiconductor element 314 due to the change of semiconductor material, the equivalent thermal conductance for n-type element assembly 414 is significantly smaller than the thermal conductance of semiconductor element 414 because of the small diameter of electrical conductor 414c.

As can also be seen from Table 3, the efficiency of thermoelectric device 410 is greater than that of conventional thermoelectric device 310. At a temperature difference of 200° K, the efficiency of thermoelectric device 410 (22.4%) is 2.25 times greater than the efficiency of thermoelectric device 10 (9.94%). At a temperature difference of 300° K, the efficiency of thermoelectric device 410 (28.8%) is 2.07 times greater than the efficiency of thermoelectric device 310 (13.9%). At a temperature difference of 400° K, the efficiency of thermoelectric device 410 (33.5%) is 1.94 times greater than the efficiency of thermoelectric device 310 (17.3%). Thus, using a semiconductor material for n-type semiconductor elements 414a, 414b that is not suitable for use in n-type semiconductor element 14 results in efficiencies for thermoelectric device 410 that are far greater than the efficiencies for conventional thermoelectric device 310.

Of course, it should be understood that the comparison of the efficiency of conventional thermoelectric device 310 to the efficiency of thermoelectric device 410 for a given temperature difference, as set forth in Table 3, does not fully demonstrate the increased efficiencies of thermoelectric device 410. Specifically, under the same operating conditions, the temperature difference between top and bottom plates 420, 422 of thermoelectric device 410 will be greater than the temperature difference between top and bottom plates 320, 322 of conventional thermoelectric device 310 (i.e., the temperature difference will not be the same as shown in Table 3). As such, the increased efficiencies of thermoelectric device 410 are even greater than those shown in Table 3.

Another measure of the performance of a thermoelectric device is its ZT value. ZT is equal to Z×T, where Z is the figure of merit and T is the average temperature in degrees Kelvin $$\left(i.e., \overline{T} = \frac{T_c + T_h}{2}\right).$$

The use of a semiconductor material for n-type semiconductor elements 414a, 414b having a Seebeck coefficient with a larger negative value provides a higher ZT value. For example, the peak ZT value of $Bi_2Te_3$ (i.e., the material for the p-type semiconductor elements used in the above examples) occurs at 400° K. Using 400° K as the mean temperature of the thermoelectric device, the ZT value of conventional thermoelectric device 310 is calculated as 1.372 (3.43×10⁻³ 1/° K×400° K) and the ZT value of thermoelectric device 410 is 34 (85.2×10⁻³ 1/° K×400° K). Thus, thermoelectric device 410 is able to attain ZT values that are significantly higher than those attainable with conventional thermoelectric device 310. To illustrate this point, Table 4 is provided below to show a side-by-side comparison of the ZT values for conventional thermoelectric device 310 and the preferred thermoelectric device 410.

TABLE 4

|  | Average Temperature $\overline{T}$ | Thermoelectric Device 310 | Thermoelectric Device 410 |
|---|---|---|---|
| ZT at ΔT = 200° K | 373° K | 1.28 | 31.78 |
| ZT at ΔT = 300° K | 423° K | 1.45 | 36.04 |
| ZT at ΔT = 400° K | 473° K | 1.62 | 40.3 |

The significant increases in the figure of merit, efficiencies and ZT values of thermoelectric device 410 described above are achieved only by changing the material used for n-type semiconductor elements 414a, 414b. One skilled in the art will appreciate that these increases can be even greater by using a semiconductor material for p-type semiconductor elements 416a, 416b having a Seebeck coefficient with a larger positive value, provided the electrical resistivity of the material is not too high (as discussed above). Thus, the thermoelectric device may include any combination of n-type and p-type semiconductor materials that result in an increase in the figure of merit and resultant efficiencies of the thermoelectric device.

Another way of demonstrating the increased efficiencies of thermoelectric device 410 in relation to those of conventional thermoelectric device 310 is to compare the change in temperature between the top and bottom plates (ΔT) that is needed to generate a fixed amount of power with a fixed amount of current through a single thermoelectric couple. The change in temperate between the top and bottom plates can be calculated from the following equation:

$$\Delta T = \frac{P - I^2 R_{eq}}{S_{eq} I} \quad (16)$$

where
ΔT=temperature difference between top and bottom plates in ° K;
P=power generated in single thermoelectric couple in W;
I=current through single thermoelectric couple in amps;
$R_{eq}$=equivalent electrical resistance of single thermoelectric couple in ohms; and
$S_{eq}$=equivalent Seebeck coefficient of single thermoelectric couple in V/° K.

For purposes of comparison, we will assume the following: (1) conventional thermoelectric device 310 is constructed with the same materials and dimensions for n-type semiconductor elements 314 and p-type semiconductor elements 316 as those described above (see Table 1) and, as such, the values for the equivalent Seebeck coefficient and equivalent electrical resistance are the same as those calculated above; (2) thermoelectric device 410 is constructed with the same materials and dimensions for n-type semiconductor elements 414a, 414b, p-type semiconductor elements 416a, 416b and electrical conductors 414c, 416c as those described in example 1 above (see Table 2) and, as such, the values for the equivalent Seebeck coefficient and equivalent electrical resistance are the same as those calculated in example 1 above; (3) the amount of power to be generated in a single thermoelectric couple of each device is 0.5 W; and (4) each device is designed to carry 10 amps of current.

The change in temperate between top and bottom plates 320, 322 of conventional thermoelectric device 310 can be calculated using equation (16), as follows:

$$\Delta T \frac{P - I^2 R_{eq}}{S_{eq} I} = \frac{0.5 - (10^2)(5.75 \times 10^{-5})}{(0.424 \times 10^{-3})(10)} = 116.57° \, K$$

Thus, there must be a temperature difference of 116.57° K between top and bottom plates 320, 322 to obtain 0.5 watts of power per thermoelectric couple.

In comparison, the change in temperate between top and bottom plates 420, 422 of thermoelectric device 410 can be calculated using equation (16), as follows:

$$\Delta T \frac{P - I^2 R_{eq}}{S_{eq} I} = \frac{0.5 - (10^2)(0.00343)}{(0.00154)(10)} = 10.19° \, K$$

Thus, there must be a temperature difference of 10.19° K between top and bottom plates 420, 422 to obtain 0.5 watts of power per thermoelectric couple. From this comparison, one skilled in the art will appreciate that the power generated in thermoelectric device 410 will be far greater than the power generated in conventional thermoelectric device 310 for the same temperature difference between the top and bottom plates.

Thus, as described above, thermoelectric device 410 is able to generate electrical power more efficiently than conventional thermoelectric device 310. The efficiency can be increased in a number of different ways. In one aspect, one or both of element assemblies 414, 416 are made using semiconductor materials with higher Seebeck coefficients that are not suitable for use with a conventional thermoelectric device. In another aspect, the distance between element assemblies 414, 416 is increased relative to that in conventional thermoelectric device 310. In another aspect, the length of electrical conductors 414c, 416c and thermal distance between top plate 420 and bottom plate 422 is increased to improve efficiency. Thus, one skilled in the art will understand that one, two, or all three aspects described above may be used to increase the efficiency of thermoelectric device 410.

Preferably, the efficiency of thermoelectric device 410 is greater than about 20%, e.g., 20%, 22%, 24%, 26%, 28%, 30%, 32%, 34%, 36%, 38%, 40% or even greater. It is believed that the maximum efficiency that can be obtained with current materials is in the range of 50% to 70%. In addition, the ZT value of thermoelectric device 410 is preferably greater than 5, e.g., 5, 10, 15, 20, 25, 30, 35, 40, 45, 50 or even greater. Of course, one skilled in the art will understand that the ZT values that can be achieved depend, in part, on the temperature difference between top plate 420 and bottom plate 422.

While the present invention has been described and illustrated hereinabove with reference to exemplary embodiments, it should be understood that various modifications could be made to these embodiments without departing from the scope of the invention. Therefore, the present invention is not to be limited to the specific configurations of the exemplary embodiments, except insofar as such limitations are included in the following claims.

What is claimed and desired to be secured by Letters Patent is as follows:

1. An engine comprising:
    a block comprising a first pathway that intersects a second pathway, wherein each of the first and second pathways has a torus shape;
    a first rotor comprising a first central disc and a first partial torus extending outward from a peripheral edge of the first central disc, wherein the first partial torus of the first rotor is positioned within the first pathway, wherein the first partial torus of the first rotor includes a leading end that comprises a first concave surface surrounding a first cavity, wherein the partial torus of the first rotor includes a trailing end that comprises a second concave surface surrounding a second cavity, and wherein the first rotor rotates within the first pathway between a first combustion position and a second combustion position;
    a second rotor comprising a second central disc and a second partial torus extending outward from a peripheral edge of the second central disc, wherein the second partial torus of the second rotor is positioned within the second pathway, wherein the second partial torus of the second rotor includes a leading end that comprises a third concave surface surrounding a third cavity, wherein the second partial torus of the second rotor comprises a trailing end that includes a fourth concave surface surrounding a fourth cavity, and wherein the second rotor rotates within the second pathway between the first combustion position and the second combustion position;
a first combustion chamber formed within the first pathway between the first and second rotors when the first and second rotors are in the first combustion position; and
a second combustion chamber formed within the second pathway between the first and second rotors when the first and second rotors are in the second combustion position.

2. The engine of claim 1, wherein a portion of the second rotor is in a location where the first and second pathways intersect when the first and second rotors are in the first combustion position, and wherein a portion of the first rotor is in a location where the first and second pathways intersect when the first and second rotors are in the second combustion position.

3. The engine of claim 1, wherein each of the first and second rotors rotates between the first and second combustion positions.

4. The engine of claim 3, wherein each of the first and second rotors rotates approximately 180 degrees between the first and second combustion positions.

5. The engine of claim 1, wherein the block comprises an intake that is in fluid communication with the first combustion chamber when the first and second rotors are in the first combustion position, wherein the intake is in fluid communication with the second combustion chamber when the first and second rotors are in the second combustion position.

6. The engine of claim 5, further comprising a valve configured to regulate air flow through the intake.

7. The engine of claim 5, wherein the block comprises an exhaust that is positioned opposite the intake.

8. The engine of claim 1, wherein a first angle between the leading end of the first rotor and the trailing end of the first rotor is between approximately 178 to 179.9 degrees, and wherein a second angle between the leading end of the second rotor and the trailing end of the second rotor is between approximately 178 to 179.9 degrees.

9. The engine of claim 1, wherein the first and second rotors are moveable to an overlapping position in which the trailing end of the first rotor and the leading end of the second rotor are each positioned in a location where the first and second pathways intersect, and wherein a portion of the trailing end of the first rotor is positioned within the third cavity of the second rotor when the first and second rotors are in the overlapping position.

10. The engine of claim 1, further comprising a first seal positioned within the first pathway between the first partial torus of the first rotor and the block when the first and second rotors are in the first combustion position, and a second seal positioned within the second pathway between the second partial torus of the second rotor and the block when the first and second rotors are in the second combustion position.

11. The engine of claim 10, wherein the first seal is positioned within a first recess that is formed in the block adjacent to the first pathway, and wherein the second seal is positioned within a second recess that is formed in the block adjacent to the second pathway.

12. The engine of claim 10, further comprising a third seal and a fourth seal each of which is positioned between a side of the first central disc of the first rotor and the block, and a fifth seal and a sixth seal each of which is positioned between a side of the second central disc of the second rotor and the block.

13. The engine of claim 12, further comprising a seventh seal positioned between the peripheral edge of the first central disc of the first rotor and the second partial torus of the second rotor when the first and second rotors are in the first combustion position, and an eighth seal positioned between the peripheral edge of the second central disc of the second rotor and the first partial torus of the first rotor when the first and second rotors are in the second combustion position.

14. The engine of claim 13, further comprising a ninth seal positioned between the partial second torus of the second rotor and the block when the first and second rotors are in the first combustion position, wherein the ninth seal is positioned between the first partial torus of the first rotor and the block when the first and second rotors are in the second combustion position.

15. The engine of claim 1, further comprising a plurality of thermoelectric devices coupled to the block that are configured to convert heat energy to electric energy.

16. The engine of claim 1, wherein the first and second rotors are coupled together such that the first and second rotors are in the first combustion position at approximately the same time and such that the first and second rotors are in the second combustion position at approximately the same time.

17. The engine of claim 16, further comprising a first shaft and a second shaft coupled with the first and second rotors, respectively, and a first gear and a second gear mounted to the first and second shafts, respectively, wherein the first gear mates with the second gear.

18. The engine of claim 17, further comprising an electric generator coupled to one of the first and second shafts.

19. The engine of claim 17, further comprising an air compressor coupled to one of the first and second shafts.

20. The engine of claim 17, wherein the block comprises a third pathway that intersects a fourth pathway, and further comprising:
a third rotor coupled to the first shaft and positioned within the third pathway, wherein the third rotor is moveable within the third pathway between a third combustion position and a fourth combustion position;
a fourth rotor coupled to the second shaft and positioned within the fourth pathway, wherein the fourth rotor is moveable within the fourth pathway between the third combustion position and the fourth combustion position;
a third combustion chamber formed within the third pathway between the third and fourth rotors when the third and fourth rotors are in the third combustion position; and
a fourth combustion chamber formed within the fourth pathway between the third and fourth rotors when the third and fourth rotors are in the fourth combustion position.

21. The engine of claim 20, wherein the first and third rotors are substantially similar and are coupled to the first shaft such that the first rotor is offset by approximately 120 degrees with respect to the third rotor, and wherein the second and fourth rotors are substantially similar and are coupled to the second shaft such that the second rotor is offset by approximately 120 degrees with respect to the fourth rotor.

22. An engine comprising:
a block comprising a first pathway, a second pathway that intersects the first pathway, and an intake, wherein a first recess is formed in the block adjacent to the first pathway, and wherein a second recess is formed in the block adjacent to the second pathway;
a first rotor comprising a first central disc and a first partial torus extending outward from a peripheral edge of the first central disc, wherein the first central disc comprises opposed first and second sides, wherein the first partial torus is positioned within the first pathway, and wherein the first rotor is moveable within the first pathway between a first combustion position and a second combustion position;

a second rotor comprising a second central disc and a second partial torus extending outward from a peripheral edge of the second central disc, wherein the second central disc comprises opposed first and second sides, wherein the second partial torus is positioned within the second pathway, and wherein the second rotor is moveable within the second pathway between the first combustion position and the second combustion position;

a first seal positioned within the first recess, wherein the first seal is positioned between the first partial torus of the first rotor and the block when the first and second rotors are in the first combustion position, and wherein each of the first seal and the first recess extends from the first side of the first central disc to the second side of the first central disc when the first and second rotors are in the first combustion position;

a second seal positioned within the second recess, wherein the second seal is positioned between the second partial torus of the second rotor and the block when the first and second rotors are in the second combustion position, and wherein each of the second seal and the second recess extends from the first side of the second central disc to the second side of the second central disc when the first and second rotors are in the second combustion position;

a first combustion chamber formed within the first pathway between the first and second rotors when the first and second rotors are in the first combustion position, wherein the intake is in fluid communication with the first combustion chamber when the first and second rotors are in the first combustion position;

a second combustion chamber formed within the second pathway between the first and second rotors when the first and second rotors are in the second combustion position, wherein the intake is in fluid communication with the second combustion chamber when the first and second rotors are in the second combustion position; and a valve configured to regulate air flow through the intake.

23. The engine of claim 22, further comprising an intake assembly that is coupled to the block adjacent to the intake, wherein the intake assembly comprises a plenum with a first opening that is in fluid communication with the intake and a second opening, wherein the valve is positioned adjacent to the second opening and is configured to regulate air flow through the second opening.

24. The engine of claim 22, further comprising a plurality of thermoelectric devices coupled to the block that are configured to convert heat energy to electric energy.

25. An engine comprising:
a block comprising a first pathway that intersects a second pathway, wherein each of the first and second pathways has a torus shape, wherein a first recess is formed in the block adjacent to the first pathway, and wherein a second recess is formed in the block adjacent to the second pathway;

a first rotor comprising a first central disc and a first partial torus extending outward from a peripheral edge of the first central disc, wherein the first central disc comprises opposed first and second sides, wherein the first partial torus of the first rotor is positioned within the first pathway, and wherein the first rotor rotates within the first pathway between a first combustion position and a second combustion position;

a second rotor comprising a second central disc and a second partial torus extending outward from a peripheral edge of the second central disc, wherein the second central disc comprises opposed first and second sides, wherein the second partial torus of the second rotor is positioned within the second pathway, and wherein the second rotor rotates within the second pathway between the first combustion position and the second combustion position;

a first combustion chamber formed within the first pathway between the first and second rotors when the first and second rotors are in the first combustion position;

a second combustion chamber formed within the second pathway between the first and second rotors when the first and second rotors are in the second combustion position;

a first shaft coupled with the first central disc of the first rotor;

a second shaft coupled with the second central disc of the second rotor;

a first gear mounted to the first shaft;

a second gear mounted to the second shaft, wherein the first gear engages the second gear;

a first seal positioned within the first recess, wherein the first seal is positioned between the first partial torus of the first rotor and the block when the first and second rotors are in the first combustion position, and wherein each of the first seal and the first recess extends from the first side of the first central disc to the second side of the first central disc when the first and second rotors are in the first combustion position; and a second seal positioned within the second recess, wherein the second seal is positioned between the second partial torus of the second rotor and the block when the first and second rotors are in the second combustion position, and wherein each of the second seal and the second recess extends from the first side of the second central disc to the second side of the second central disc when the first and second rotors are in the second combustion position.

26. The engine of claim 25, further comprising a third seal positioned between the first side of the first central disc and the block, a fourth seal positioned between the second side of the first central disc and the block, a fifth seal positioned between the first side of the second central disc and the block, and a sixth seal positioned between the second side of the second central disc and the block.

27. The engine of claim 26, further comprising a seventh seal positioned between the peripheral edge of the first central disc of the first rotor and the second partial torus of the second rotor when the first and second rotors are in the first combustion position, and an eighth seal positioned between the peripheral edge of the second central disc of the second rotor and the first partial torus of the first rotor when the first and second rotors are in the second combustion position.

28. The engine of claim 25, further comprising a plurality of thermoelectric devices coupled to the block that are configured to convert heat energy to electric energy.

* * * * *

UNITED STATES PATENT AND TRADEMARK OFFICE
CERTIFICATE OF CORRECTION

PATENT NO. : 9,334,793 B1  
APPLICATION NO. : 14/534426  
DATED : May 10, 2016  
INVENTOR(S) : Michel Marc Page 1 of 1

It is certified that error appears in the above-identified patent and that said Letters Patent is hereby corrected as shown below:

In the specification,

Column 24,
Line 20, delete "$K_p$" and insert -- $K_n$ -- therefor.

Column 24,
Line 64, delete "(T=273° K)" and insert -- ($T_c$=273° K) --.

Column 25,
Line 17, delete "(T=273° K)" and insert -- ($T_c$=273° K) --.

Column 26,
Heading in Table 2, Lines 32 and 33, delete "n-type semiconductor element ($Bi_2Te_3$ + 0.1 %I)" and insert -- n-type semiconductor element ($Bi_2S_3$ (sintered)) -- therefor.

Signed and Sealed this  
Second Day of August, 2016

Michelle K. Lee  
*Director of the United States Patent and Trademark Office*